US012570253B2

(12) United States Patent
Wang et al.

(10) Patent No.: US 12,570,253 B2
(45) Date of Patent: Mar. 10, 2026

(54) BRAKE SYSTEM AND CONTROL METHOD THEREFOR

(71) Applicant: TEKTRO TECHNOLOGY CORPORATION, Changhua County (TW)

(72) Inventors: Tzu-Chang Wang, Changhua County (TW); Po-Hsien Huang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 678 days.

(21) Appl. No.: 18/078,808

(22) Filed: Dec. 9, 2022

(65) Prior Publication Data

US 2023/0202436 A1      Jun. 29, 2023

(30) Foreign Application Priority Data

Dec. 28, 2021     (TW) ................................. 110149146

(51) Int. Cl.
*B60T 8/171*         (2006.01)
*B60T 8/1766*        (2006.01)
*B60T 8/34*          (2006.01)

(52) U.S. Cl.
CPC ............ *B60T 8/171* (2013.01); *B60T 8/1766* (2013.01); *B60T 8/344* (2013.01)

(58) Field of Classification Search
None
See application file for complete search history.

(56) References Cited

U.S. PATENT DOCUMENTS

| | | | | |
|---|---|---|---|---|
| 5,620,237 | A * | 4/1997 | Iwashita ................. | B60T 8/261 |
| | | | | 188/106 P |
| 6,733,089 | B1 * | 5/2004 | Wakabayashi ............ | B62L 3/08 |
| | | | | 188/344 |
| 2020/0283090 | A1 * | 9/2020 | Dunlap, III ........... | F16D 55/228 |
| 2021/0009231 | A1 * | 1/2021 | Tsai ...................... | B60T 13/662 |

FOREIGN PATENT DOCUMENTS

JP            2000006779  A  *  1/2000   ............ B60T 8/3225

OTHER PUBLICATIONS

JP-2000006779-A: English Machine Translation (Year: 2000).*

* cited by examiner

*Primary Examiner* — Melanie Torres Williams
(74) *Attorney, Agent, or Firm* — Maschoff Brennan

(57)          ABSTRACT

A brake system includes a first and a second hydraulic brake assembly, a first and a second switch and a first electronic brake assembly. The first hydraulic brake assembly includes a first brake caliper and a first brake lever connected to each other. The second hydraulic brake assembly includes a second brake caliper and a second brake lever connected to each other. The first switch is activated by the first brake lever when the first brake lever is operated. The second switch is activated by the second brake lever when the second brake lever is operated. The first electronic brake assembly is connected to the second hydraulic brake assembly. The first electronic brake assembly controls an oil pressure applied to the second brake caliper according to whether the first switch and the second switch are activated.

16 Claims, 13 Drawing Sheets

BRAKE SYSTEM AND CONTROL METHOD THEREFOR

CROSS-REFERENCE TO RELATED APPLICATIONS

This non-provisional application claims priority under 35 U.S.C. § 119(a) on Patent Application No(s). 110149146 filed in Taiwan, R.O.C. on Dec. 28, 2021, the entire contents of which are hereby incorporated by reference.

TECHNICAL FIELD

The disclosure provides a brake system and a control method therefor, more particularly to a bicycle brake system and a control method therefor.

BACKGROUND

In recent years, road bikes, mountain bikes and other types of bicycles are all popular in the market, and it motivates bicycle manufacturers to pay more attention on improving their products.

As for a brake system of a bicycle, a front caliper and a rear caliper respectively used to brake the front wheel and rear wheel are respectively controlled by two brake levers. When a user operates one of the brake levers, only the front caliper is driven to brake the front wheel, or only the rear caliper is driven to brake the rear wheel, such that the difference between the speeds of the front and rear wheels is significant, causing safety issues during the braking process. Therefore, how to solve the aforementioned issue is one of the crucial topics in this field.

SUMMARY

The disclosure provides a brake system and a control method therefor which are capable of preventing the difference between the speeds of the front and rear wheels from being too large.

One embodiment of the disclosure provides a brake system. The brake system includes a first hydraulic brake assembly, a second hydraulic brake assembly, a first switch, a second switch and a first electronic brake assembly. The first hydraulic brake assembly includes a first brake caliper and a first brake lever connected to each other. The first brake lever is configured to be operated to drive the first brake caliper. The second hydraulic brake assembly includes a second brake caliper and a second brake lever connected to each other. The second brake lever is configured to be operated to drive the second brake caliper. The first switch is configured to be activated by the first brake lever when the first brake lever is operated. The second switch is configured to be activated by the second brake lever when the second brake lever is operated. The first electronic brake assembly is connected to the second hydraulic brake assembly. The first electronic brake assembly controls an oil pressure applied to the second brake caliper according to whether the first switch and the second switch are activated or not.

Another embodiment of the disclosure provides a control method for a brake system. The brake system includes a first brake caliper, a first brake lever configured to be operated to drive the first brake caliper, a first switch activated by the first brake lever when the first brake lever is operated, a second brake caliper, a second brake lever configured to be operated to drive the second brake caliper and a second switch activated by the second brake lever when the second brake lever is operated. The control method includes that a first electronic brake assembly which is connected to the second brake caliper controls an oil pressure applied to the second brake caliper according to whether the first switch and the second switch are activated or not.

Still another embodiment provides a control method for a brake system. The brake system includes a first brake caliper, a first brake lever configured to be operated to drive the first brake caliper, a first switch activated by the first brake lever when the first brake lever is operated, a second brake caliper and a second brake lever configured to be operated to drive the second brake caliper. The control method includes that a first electronic brake assembly which is connected to the second brake caliper controls an oil pressure applied to the second brake caliper according to a wheel speed of a front wheel and a wheel speed of a rear wheel after the first switch is activated.

Yet another embodiment of the disclosure provides a brake system. The brake system includes a first hydraulic brake assembly, a second hydraulic brake assembly, a first switch and a first electronic brake assembly. The a first hydraulic brake assembly includes a first brake caliper and a first brake lever connected to each other. The first brake lever is configured to be operated to drive the first brake caliper. The second hydraulic brake assembly includes a second brake caliper and a second brake lever connected to each other. The second brake lever is configured to be operated to drive the second brake caliper. The first switch is configured to be activated by the first brake lever when the first brake lever is operated. The first electronic brake assembly is connected to the second hydraulic brake assembly. The first electronic brake assembly is configured to control an oil pressure applied to the second brake caliper according to a wheel speed of a front wheel and a wheel speed of a rear wheel after the first switch is activated.

According to the brake systems and the control methods therefor as disclosed in the above embodiments, the first switch that is used to be activated by the first brake lever is electrically connected to the first electronic brake assembly, and the first electronic brake assembly is connected to the second hydraulic brake assembly, such that when the first brake lever is operated, the first brake lever not only drives the first brake caliper, but also enables the first electronic brake assembly to control the oil pressure applied to the second brake caliper. As a result, in the case that the two brake calipers correspond to the front wheel and the rear wheel of the bicycle, the difference between the wheel speeds of the front wheel and the rear wheel can be reduced while the first brake lever is operated, thereby increasing the safety during the braking process.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
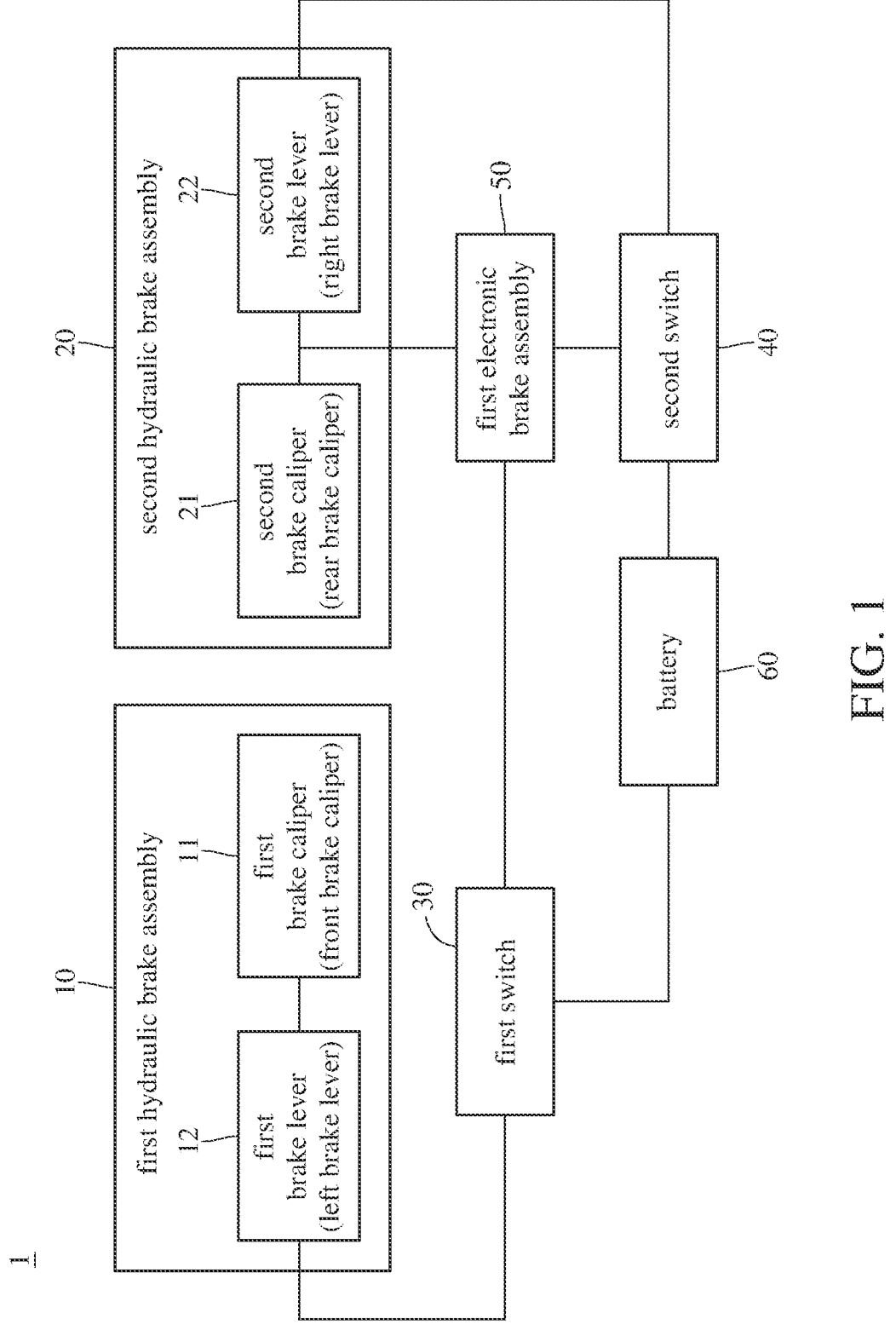
FIG. 1 is a block diagram of a brake system according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Refer to FIG. 1, where FIG. 1 is a block diagram of a brake system 1 according to a first embodiment of the disclosure.

In this embodiment, the brake system 1 includes a first hydraulic brake assembly 10, a second hydraulic brake assembly 20, a first switch 30, a second switch 40 and a first electronic brake assembly 50. In addition, the brake system 1 may further include a battery 60.

The first hydraulic brake assembly 10 includes a first brake caliper 11 and a first brake lever 12 connected to each other. The first brake caliper 11 is, for example, a front brake caliper of a bicycle and corresponds to a front wheel of the bicycle. The first brake lever 12 is, for example, a left brake lever of the bicycle. The first brake lever 12 is connected to the first brake caliper 11, for example, via an oil pipe (not shown). The first brake lever 12, for example, includes a hydraulic housing, a lever, a piston and a link (not shown). The lever is pivotally disposed on the hydraulic housing, the piston is movably located in the hydraulic housing, and the piston is connected to the lever via the link. When the lever is operated, the piston is moved in the hydraulic housing by the link so as to produce an oil pressure, and the oil pressure is transmitted to the first brake caliper 11 via the oil pipe so as to drive the first brake caliper 11 to brake the front wheel.

The second hydraulic brake assembly 20 included a second brake caliper 21 and a second brake lever 22 connected to each other. The second brake caliper 21 is, for example, a rear brake caliper of a bicycle and corresponds to a rear wheel of the bicycle. The second brake lever 22 is, for example, a right brake lever of the bicycle. The second brake lever 22 is connected to the second brake caliper 21, for example, via an oil pipe (not shown). The second brake lever 22, for example, includes a hydraulic housing, a lever, a piston and a link (not shown). The lever is pivotally disposed on the hydraulic housing, the piston is movably located in the hydraulic housing, and the piston is connected to the lever via the link. When the lever is operated, the piston is moved in the hydraulic housing by the link so as to produce an oil pressure, and the oil pressure is transmitted to the second brake caliper 21 via the oil pipe so as to drive the second brake caliper 21 to brake the rear wheel.

The first switch 30 is configured to be activated by the first brake lever 12 when the first brake lever 12 is operated. In one embodiment, the first switch 30 may be disposed on the hydraulic housing of the first brake lever 12. In such a case, when the lever of the first brake lever 12 is operated, the first switch 30 is directly activated by the lever of the first brake lever 12. In another embodiment, the first switch 30 may be disposed at a proper position of an oil path between the first brake lever 12 and the first brake caliper 11. In such a case, when the lever of the first brake lever 12 is operated, the first switch 30 is activated by the lever of the first brake lever 12 via the oil pressure.

The second switch 40 is configured to be activated by the second brake lever 22 when the second brake lever 22 is operated. In one embodiment, the second switch 40 may be disposed on the hydraulic housing of the second brake lever 22. In such a case, when the lever of the second brake lever 22 is operated, the second switch 40 is directly activated by the lever of the second brake lever 22. In another embodiment, the second switch 40 may be disposed at a proper position of an oil path between the second brake lever 22 and the second brake caliper 21. In such a case, when the lever of the second brake lever 22 is operated, the second switch 40 is activated by the lever of the second brake lever 22 via the oil pressure.

The first electronic brake assembly 50 is electrically connected to the first switch and the second switch 40 via wires (not shown), and the first electronic brake assembly 50 is connected to the second hydraulic brake assembly 20. For example, the first electronic brake assembly 50 may be disposed at a proper position of the oil path between the second brake lever 22 and the second brake caliper 21. The first electronic brake assembly 50, for example, includes a motor and a piston (not shown). The motor can move the piston so as to produce an oil pressure in the oil path to drive the second brake caliper 21. In another embodiment, the first electronic brake assembly 50 is preferably disposed on the hydraulic housing of the second brake lever 22, and the first electronic brake assembly 50, for example, includes a motor and a transmission component (not shown). The motor is connected to the link of the second brake lever 22 via the transmission component, such that the motor can move the piston of the second brake lever 22 in the hydraulic housing via the transmission component and the link of the second brake lever 22 so as to produce an oil pressure for driving the second brake caliper 21.

The battery 60 is electrically connected to the first switch 30 and the second switch 40, and is electrically connected to the first electronic brake assembly 50 via the first switch and the second switch 40 so as to provide electricity to the first switch 30, the second switch 40 and the first electronic brake assembly 50. The battery 60 can be disposed at any proper place of the bicycle, such as the first brake lever 12 or the second brake lever 22.

Figure 2:
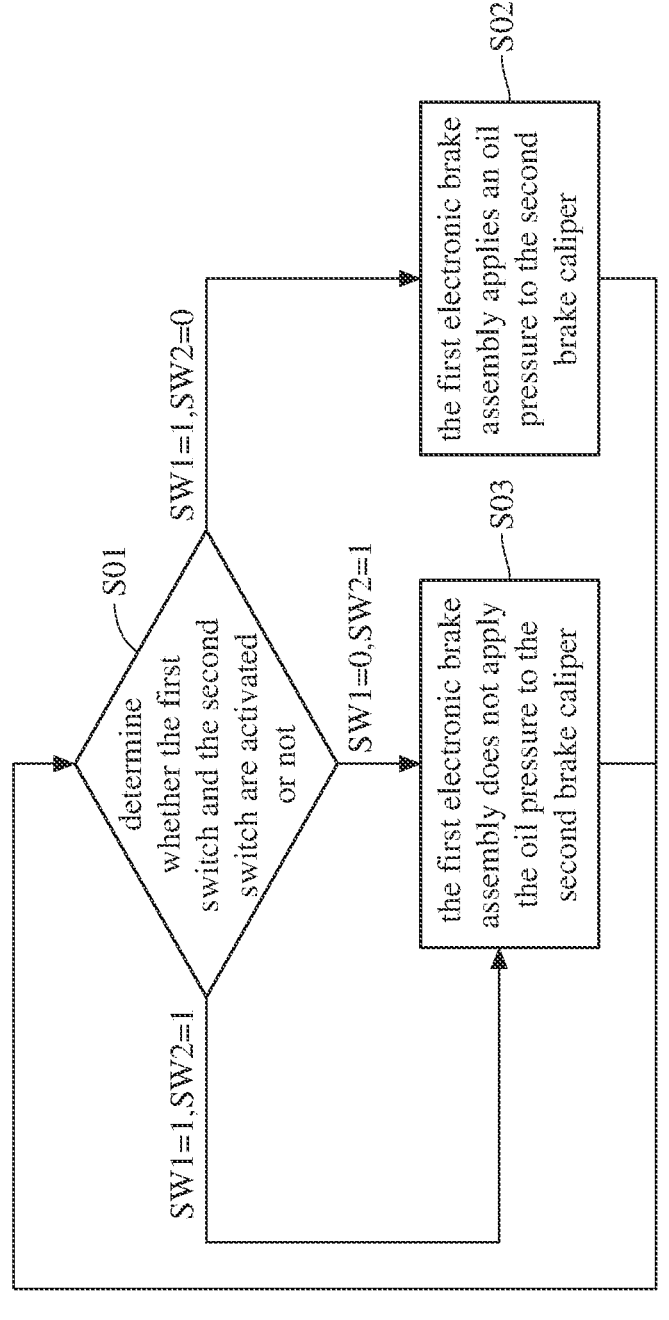
FIG. 2 is a flow chart of a control method for a brake system according to a second embodiment of the disclosure.

Then, the following paragraphs will introduce a control method cooperated with the brake system 1 shown in FIG. 1. Refer to FIGS. 1 and 2, where FIG. 2 is a flow chart of the control method for the brake system 1 according to a second embodiment of the disclosure.

The control method includes that the first electronic brake assembly 50 controls the oil pressure applied to the second brake caliper 21 according to whether the first switch and the second switch 40 are activated or not. The following paragraphs will further introduce the control method in detail.

Firstly, the step S01 is performed to determine whether the first switch 30 and the second switch 40 are activated or not. In FIG. 2, "SW1=1" represents that the first switch 30 is activated, "SW1=0" represents that the first switch 30 is not activated, "SW2=1" represents that the second switch 40 is activated, and "SW2=0" represents that the second switch 40 is not activated.

In the step S01, when the first switch 30 is activated and the second switch 40 is not activated, the step S02 is performed to enable the first electronic brake assembly 50 to apply an oil pressure to the second brake caliper 21. Specifically, when the first brake lever 12 is operated and the second brake lever 22 is not operated, the first switch 30 is activated by the first brake lever 12, and the second switch 40 is not activated by the second brake lever 22, such that the first electronic brake assembly 50 is driven to apply the oil pressure to the second brake caliper 21. As a result, when the first brake lever 12 is operated, the first brake lever 12 not only drives the first brake caliper 11 to brake the front wheel, but also enables the first electronic brake assembly 50 to drive the second brake caliper 21 to brake the rear wheel, such that the difference between the wheel speed of the front wheel and the wheel speed of the rear wheel can be decreased, thereby increasing the safety during the braking process.

In the step S01, when the first switch 30 is not activated and the second switch 40 is activated, the step S03 is performed not to enable the first electronic brake assembly 50 to apply the oil pressure to the second brake caliper 21. Specifically, when the first brake lever 12 is not operated and the second brake lever 22 is operated, the second brake lever 22 drives the second brake caliper 21 to brake the rear wheel and activates the second switch 40, and the first switch 30 is in a non-activated state. In such a case, the activation of the second switch 40 disables the first electronic brake assembly 50, such that the first electronic brake assembly 50 is not driven to apply the oil pressure to the second brake caliper 21.

In the step S01, when the first switch 30 and the second switch 40 both are activated, the step S03 is performed not to enable the first electronic brake assembly 50 to apply the oil pressure to the second brake caliper 21. That is, when the first brake lever 12 and the second brake lever 22 both are operated, the first switch 30 and the second switch 40 are respectively activated by the first brake lever 12 and the second brake lever 22. In such a case, the first electronic brake assembly 50 is not driven to apply the oil pressure to the second brake caliper 21.

More specifically, when the first brake lever 12 is operated and the second brake lever 22 is not operated (e.g., the step S02), the first switch 30 is activated so as to enable the first electronic brake assembly 50 to apply the oil pressure to the second brake caliper 21. Then, when the second brake lever 22 is further operated so as to activate the second switch used to disable the first electronic brake assembly 50, the activation of the second switch makes the first electronic brake assembly 50 stop applying the oil pressure to the second brake caliper 21.

In another case, when the first brake lever 12 is not operated and the second brake lever 22 is operated, the second switch 40 is activated so as to disable the first electronic brake assembly 50. Then, when the first brake lever 12 is further operated to activate the first switch 30, the activation of the first switch 30 will not enable the first electronic brake assembly 50 to apply the oil pressure to the second brake caliper 21 because the activation of the second switch 40 has already disabled the first electronic brake assembly 50.

In still another case, when the first brake lever 12 and the second brake lever 22 are simultaneously operated, the activation of the first switch 30 will not enable the first electronic brake assembly 50 to apply the oil pressure to the second brake caliper 21 because the activation of the second switch 40 disables the first electronic brake assembly 50.

As a result, in the case that the second switch 40 is activated by the second brake lever 22, no matter the first switch 30 activated by the first brake lever 12 is activated before or after the second switch 40 is activated, or the first switch 30 and the second switch 40 are simultaneously activated, the first electronic brake assembly 50 and the second brake lever 22 will not apply the oil pressures to the second brake caliper 21 together, and thus the second brake lever 22 and the first electronic brake assembly 50 are prevented from applying the oil pressures to the second brake caliper 21 at the same time. That is, the second brake caliper 21 is merely driven by the oil pressure provided by the second brake lever 22, and thus the second brake caliper 21 will not brake the rear wheel too hard, thereby ensuring the safety during the braking process.

In the step S01, the case that the first switch 30 and the second switch 40 both are not activated represents that the first brake lever 12 and the second brake lever 22 both are not operated; that is, the bicycle is not in the braking state, and thus this case will not be further discussed.

Figure 3:
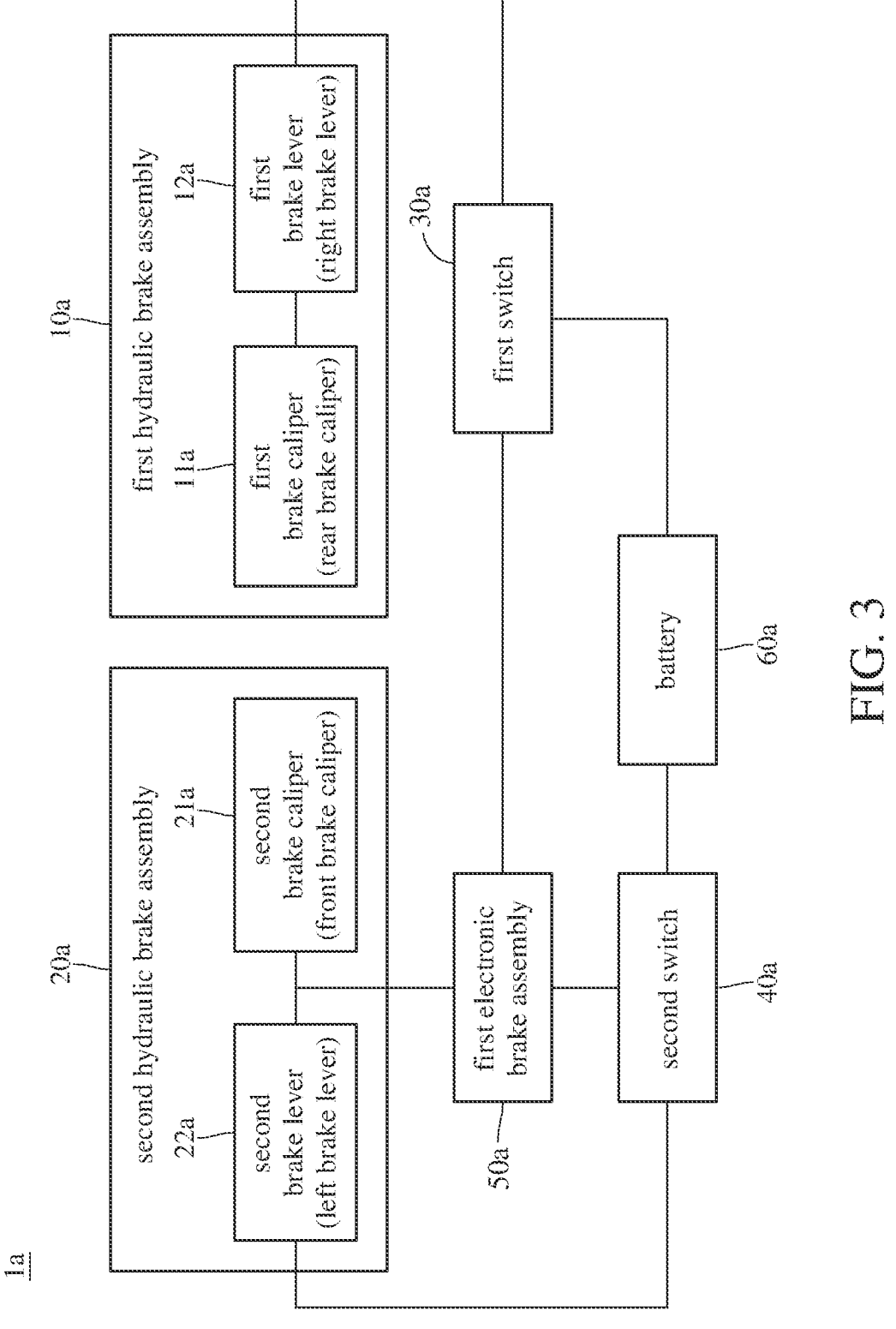
FIG. 3 is a block diagram of a brake system according to a third embodiment of the disclosure.

In the above embodiment, the first brake caliper 11 is the front brake caliper, the first brake lever 12 is the left brake lever, the second brake caliper 21 is the rear brake caliper, and the second brake lever 22 is the right brake lever, but the disclosure is not limited thereto. For example, refer to FIG. 3, where FIG. 3 is a block diagram of a brake system 1*a* according to a third embodiment of the disclosure.

The brake system 1*a* of this embodiment is similar to the brake system 1 with the reference to FIG. 1, the brake system 1*a* also includes a first hydraulic brake assembly 10*a*, a second hydraulic brake assembly 20*a*, a first switch 30*a*, a second switch 40*a*, a first electronic brake assembly 50*a* and a battery 60*a*, the main difference between the brake systems 1 and 1*a* is that the first brake caliper 11*a* is a rear brake caliper, the first brake lever 12*a* is a right brake lever, the second brake caliper 21*a* is a front brake caliper, and the second brake lever 22*a* is a left brake lever, and thus the detail structures of the aforementioned components of the brake system 1*a* of this embodiment and the connections among them can be referred to that of the brake system 1 with reference to FIG. 1 and will not be repeatedly introduced hereinafter.

In the case that the brake system 1*a* of this embodiment is applied to the control method shown in FIG. 2, when the first switch 30*a* is activated and the second switch 40*a* is not activated, the first electronic brake assembly 50*a* is driven to apply the oil pressure to the second brake caliper 21*a* (e.g., the front brake caliper). On the other hand, when the first switch 30a and the second switch 40a both are activated, or the first switch 30a is not activated and the second switch 40a is activated, the first electronic brake assembly 50a is not driven so as not to apply the oil pressure to the second brake caliper 21a (e.g., the front brake caliper).

Figure 4:
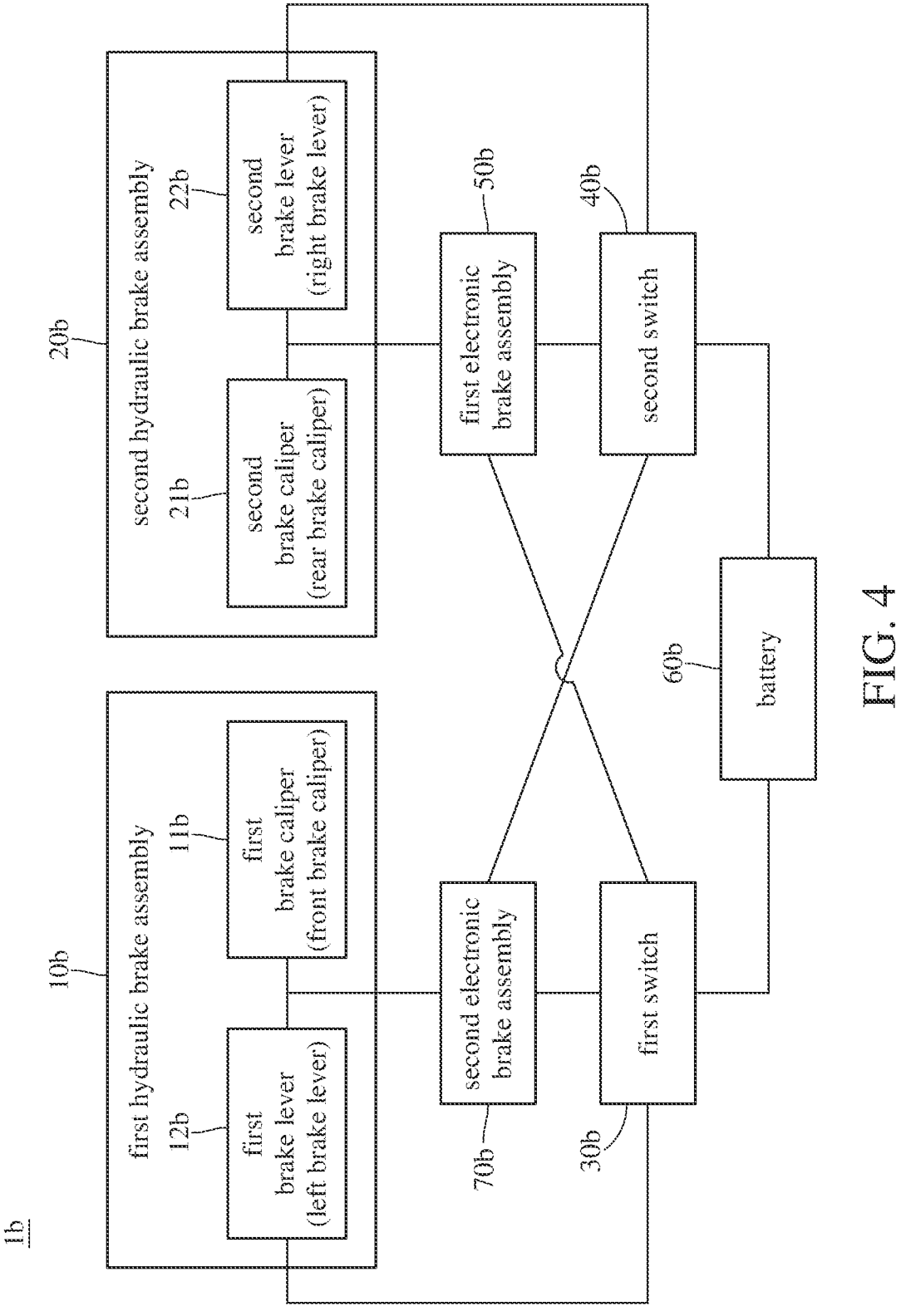
FIG. 4 is a block diagram of a brake system according to a fourth embodiment of the disclosure.

Then, refer to FIG. 4, where FIG. 4 is a block diagram of a brake system 1b according to a fourth embodiment of the disclosure.

The brake system 1b of this embodiment also includes a first hydraulic brake assembly 10b, a second hydraulic brake assembly 20b, a first switch 30b, a second switch 40b, a first electronic brake assembly 50b and a battery 60b, and the brake system 1b further includes a second electronic brake assembly 70b compared to the brake system 1 with reference to FIG. 1.

In the brake system 1b of this embodiment, the first hydraulic brake assembly 10b, the second hydraulic brake assembly 20b, the first switch 30b, the second switch 40b, the first electronic brake assembly 50b and the battery 60b are the same as the first hydraulic brake assembly 10, the second hydraulic brake assembly 20, the first switch 30, the second switch 40, the first electronic brake assembly 50 and the battery 60 of the brake system 1 with reference to FIG. 1, and thus the detail introductions of them can be referred to the brake system 1 with reference to FIG. 1 and will not be repeatedly introduced hereinafter. The following paragraph mainly introduces the detail structure of the second electronic brake assembly 70b and the connections between the second electronic brake assembly 70b and other components.

In this embodiment, the second electronic brake assembly 70b is electrically connected to the first switch 30b and the second switch 40b, and the second electronic brake assembly 70b is connected to the first hydraulic brake assembly 10b. For example, the second electronic brake assembly 70b may be disposed at a proper position of the oil path between the first brake lever 12b and the first brake caliper 11b. The second electronic brake assembly 70b, for example, includes a motor and a piston (not shown). The motor can move the piston so as to produce an oil pressure in the oil path to drive the first brake caliper 11b. In another embodiment, the second electronic brake assembly 70b is preferably disposed on the hydraulic housing of the first brake lever 12b, and the second electronic brake assembly 70b, for example, includes a motor and a transmission component (not shown). The motor is connected to the link of the first brake lever 12b via the transmission component, such that the motor can move the piston of the first brake lever 12b in the hydraulic housing via the transmission component and the link of the first brake lever 12b so as to produce an oil pressure for driving the first brake caliper 11b.

Figure 5:
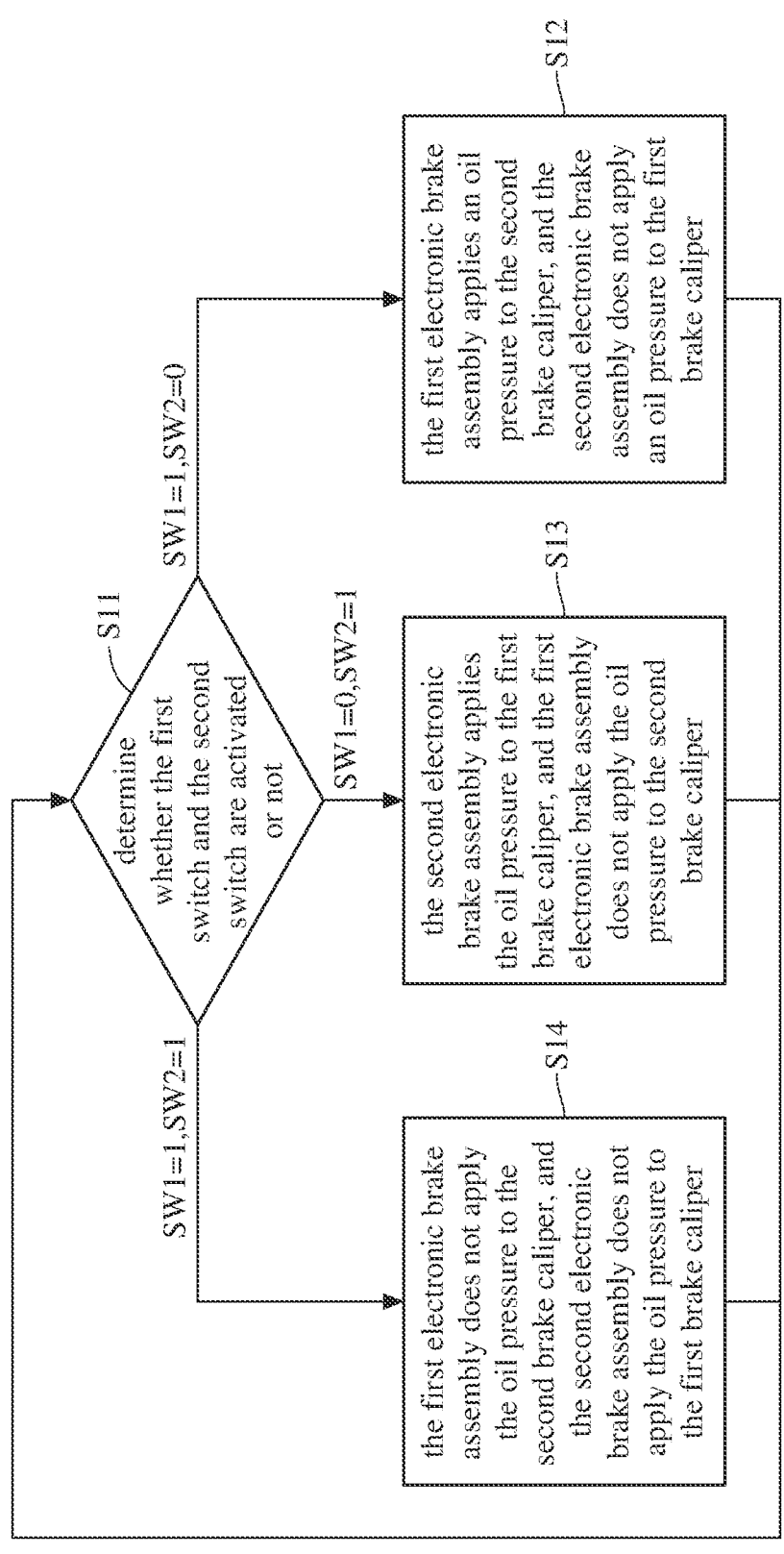
FIG. 5 is a flow chart of a control method for a brake system according to a fifth embodiment of the disclosure.

Then, the following paragraphs will introduce a control method cooperated with the brake system 1b shown in FIG. 4. Refer to FIGS. 4 and 5, where FIG. 5 is a flow chart of the control method for the brake system 1b according to a fifth embodiment of the disclosure. The control method includes that the first electronic brake assembly 50b controls the oil pressure applied to the second brake caliper 21b according to whether the first switch 30b and the second switch 40b are activated or not, and the second electronic brake assembly 70b controls the oil pressure applied to the first brake caliper 11b according to whether the first switch 30b and the second switch 40b are activated or not. The following paragraphs will further introduce the control method in detail.

Firstly, the step S11 is performed to determine whether the first switch 30 and the second switch 40 are activated or not.

In FIG. 5, "SW1=1" represents that the first switch 30b is activated, "SW1=0" represents that the first switch 30b is not activated, "SW2=1" represents that the second switch 40b is activated, and "SW2=0" represents that the second switch 40b is not activated.

In the step S11, when the first switch 30b is activated and the second switch 40b is not activated, the step S12 is performed to enable the first electronic brake assembly 50b to apply an oil pressure to the second brake caliper 21b, and not to enable the second electronic brake assembly 70b to apply an oil pressure to the first brake caliper 11b. Specifically, when the first brake lever 12b is operated and the second brake lever 22b is not operated, the first switch 30b is activated by the first brake lever 12b, and the second switch 40b is not activated by the second brake lever 22b, such that the first electronic brake assembly 50b is driven to apply the oil pressure to the second brake caliper 21b, and the second electronic brake assembly 70b is not driven to apply an oil pressure to the first brake caliper 11b. As a result, when the first brake lever 12b is operated, the first brake lever 12b not only drives the first brake caliper 11b to brake the front wheel, but also enables the first electronic brake assembly 50b to drive the second brake caliper 21b to brake the rear wheel, such that the difference between the wheel speed of the front wheel and the wheel speed of the rear wheel can be decreased, thereby increasing the safety during the braking process.

In the step S11, when the first switch 30b is not activated and the second switch 40b is activated, the step S13 is performed to enable the second electronic brake assembly 70b to apply an oil pressure to the first brake caliper 11b, and not to enable the first electronic brake assembly 50b to apply an oil pressure to the second brake caliper 21b. Specifically, when the second brake lever 22b is operated and the first brake lever 12b is not operated, the second switch 40b is activated by the second brake lever 22b, and the first switch 30b is not activated by the first brake lever 12b, such that the second electronic brake assembly 70b is driven to apply an oil pressure to the first brake caliper 11b, and the first electronic brake assembly 50b is not driven to apply the oil pressure to the second brake caliper 21b. As a result, when the second brake lever 22b is operated, the second brake lever 22b not only drives the second brake caliper 21b to brake the rear wheel, but also enables the second electronic brake assembly 70b to drive the first brake caliper 11b to brake the front wheel, such that the difference between the wheel speed of the front wheel and the wheel speed of the rear wheel can be decreased, thereby increasing the safety during the braking process.

In the step S11, when the first switch 30b and the second switch 40b both are activated, the step S14 is performed not to enable the first electronic brake assembly 50b to apply the oil pressure to the second brake caliper 21b and not to enable the second electronic brake assembly 70b to apply the oil pressure to the first brake caliper 11b. That is, when the first brake lever 12b and the second brake lever 22b both are operated, the first switch 30b and the second switch 40b are respectively activated by the first brake lever 12b and the second brake lever 22b. At this case, the first electronic brake assembly 50b is not driven to apply the oil pressure to the second brake caliper 21b, and the second electronic brake assembly 70b is not driven to apply the oil pressure to the first brake caliper 11b.

Specifically, the first switch 30b is served as a disable switch of the second electronic brake assembly 70b, and the second switch 40b is served as a disable switch of the first electronic brake assembly 50b. After the first switch 30b is activated, the disable control of the first switch 30b to the second electronic brake assembly 70b overrides the activation control of the second switch 40b to the second electronic brake assembly 70b. Similarly, the disable control of the second switch 40b to the first electronic brake assembly 50b overrides the activation control of the first switch 30b to the first electronic brake assembly 50b. Therefore, no matter the first switch 30b is activated before or after the second switch 40b is activated, or the first switch 30b and the second switch 40b are activated simultaneously, the activated first switch 30b and the activated second switch 40b respectively disable the second electronic brake assembly 70b and the first electronic brake assembly 50b, and thus the second brake lever 22b and the first electronic brake assembly 50b are prevented from applying the oil pressures to the second brake caliper 21b at the same time, and the first brake lever 12b and the second electronic brake assembly 70b are prevented from applying the oil pressures to the first brake caliper 11b at the same time. That is, the first brake caliper 11b is merely driven by the oil pressure provided by the first brake lever 12b, and the second brake caliper 21b is merely driven by the oil pressure provided by the second brake lever 22b, and thus the first brake caliper 11b will not brake the front wheel too hard, and the second brake caliper 21b will not brake the rear wheel too hard, thereby ensuring the safety during the braking process.

In the step S11, the case that the first switch 30b and the second switch 40b both are not activated represents that the first brake lever 12b and the second brake lever 22b both are not operated; that is, the bicycle is not in the braking state, and thus this case will not be further discussed.

Figure 6:
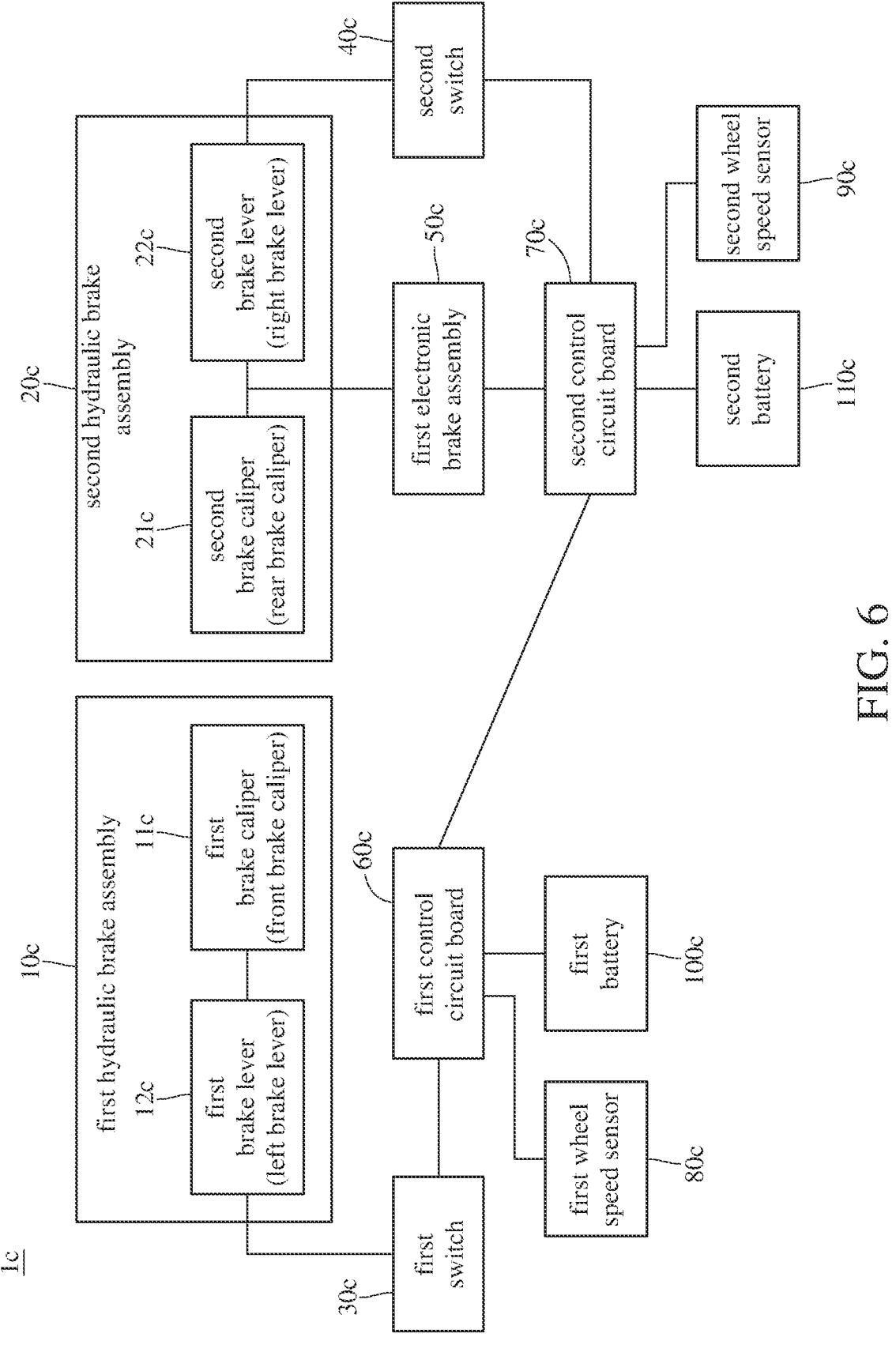
FIG. 6 is a block diagram of a brake system according to a sixth embodiment of the disclosure.

Then, refer to FIG. 6, where FIG. 6 is a block diagram of a brake system 1c according to a sixth embodiment of the disclosure.

In this embodiment, the brake system 1c includes a first hydraulic brake assembly 10c, a second hydraulic brake assembly 20c, a first switch 30c, a second switch 40c and a first electronic brake assembly 50c. In addition, the brake system 1c further includes a first control circuit board 60c, a second control circuit board 70c, a first wheel speed sensor 80c, a second wheel speed sensor 90c, a first battery 100c and a second battery 110c.

The first hydraulic brake assembly 10c includes a first brake caliper 11c and a first brake lever 12c connected to each other. The first brake caliper 11c is, for example, a front brake caliper of a bicycle and corresponds to a front wheel of the bicycle. The first brake lever 12c is, for example, a left brake lever of the bicycle. The first brake lever 12c is connected to the first brake caliper 11c, for example, via an oil pipe (not shown). The first brake lever 12c, for example, includes a hydraulic housing, a lever, a piston and a link (not shown). The lever is pivotally disposed on the hydraulic housing, the piston is movably located in the hydraulic housing, and the piston is connected to the lever via the link. When the lever is operated, the piston is moved in the hydraulic housing by the link so as to produce an oil pressure, and the oil pressure is transmitted to the first brake caliper 11c via the oil pipe so as to drive the first brake caliper 11c to brake the front wheel.

The second hydraulic brake assembly 20c included a second brake caliper 21c and a second brake lever 22c connected to each other. The second brake caliper 21c is, for example, a rear brake caliper of a bicycle and corresponds to a rear wheel of the bicycle. The second brake lever 22c is, for example, a right brake lever of the bicycle. The second brake lever 22c is connected to the second brake caliper 21c, for example, via an oil pipe (not shown). The second brake lever 22c, for example, includes a hydraulic housing, a lever, a piston and a link (not shown). The lever is pivotally disposed on the hydraulic housing, the piston is movably located in the hydraulic housing, and the piston is connected to the lever via the link. When the lever is operated, the piston is moved in the hydraulic housing by the link so as to produce an oil pressure, and the oil pressure is transmitted to the second brake caliper 21c via the oil pipe so as to drive the second brake caliper 21c to brake the rear wheel.

The first switch 30c is configured to be activated by the first brake lever 12c when the first brake lever 12c is operated. In one embodiment, the first switch 30c may be disposed on the hydraulic housing of the first brake lever 12c. In such a case, when the lever of the first brake lever 12c is operated, the first switch 30c is directly activated by the lever of the first brake lever 12c. In another embodiment, the first switch 30c may be disposed at a proper position of an oil path between the first brake lever 12c and the first brake caliper 11c. In such a case, when the lever of the first brake lever 12 is operated, the first switch 30 is activated by the lever of the first brake lever 12 via the oil pressure.

The second switch 40c is configured to be activated by the second brake lever 22c when the second brake lever 22c is operated. In one embodiment, the second switch 40c may be disposed on the hydraulic housing of the second brake lever 22c. In such a case, when the lever of the second brake lever 22c is operated, the second switch 40c is directly activated by the lever of the second brake lever 22c. In another embodiment, the second switch 40c may be disposed at a proper position of an oil path between the second brake lever 22c and the second brake caliper 21c. In such a case, when the lever of the second brake lever 22c is operated, the second switch 40c is activated by the lever of the second brake lever 22c via the oil pressure.

The first electronic brake assembly 50c is connected to the second hydraulic brake assembly 20c. For example, the first electronic brake assembly 50c may be disposed at a proper position of the oil path between the second brake lever 22c and the second brake caliper 21c. The first electronic brake assembly 50c, for example, includes a motor and a piston (not shown). The motor can move the piston so as to produce an oil pressure in the oil path to drive the second brake caliper 21c. In another embodiment, the first electronic brake assembly 50c is preferably disposed on the hydraulic housing of the second brake lever 22c, and the first electronic brake assembly 50c, for example, includes a motor and a transmission component (not shown). The motor is connected to the link of the second brake lever 22c via the transmission component, such that the motor can move the piston of the second brake lever 22c in the hydraulic housing via the transmission component and the link of the second brake lever 22c so as to produce an oil pressure for driving the second brake caliper 21c.

The first control circuit board 60c is, for example, disposed on the first brake lever 12c. The first switch 30c, the first wheel speed sensor 80c and the first battery 100c are electrically connected to the first control circuit board 60c. The first wheel speed sensor 80c is, for example, configured to measure a wheel speed of the front wheel of the bicycle, and the first battery 100c is configured to provide electricity to the first switch 30c, the first control circuit board 60c and the first wheel speed sensor 80c.

The second control circuit board 70c is, for example, disposed on the second brake lever 22c. The second switch 40c, the first electronic brake assembly 50c, the second wheel speed sensor 90c and the second battery 110c are electrically connected to the second control circuit board 70c. The second wheel speed sensor 90c is, for example, configured to measure a wheel speed of the rear wheel of the bicycle, and the second battery 110c is configured to provide electricity to the second switch 40c, the first electronic brake assembly 50c, the second control circuit board 70c and the second wheel speed sensor 90c.

Each of the first control circuit board 60c and the second control circuit board 70c, for example, has a wireless transmission unit (not shown), the first control circuit board 60c and the second control circuit board 70c are in signal communication with each other via a wireless manner; that is, a signal can be transmitted between the first control circuit board 60c and the second control circuit board 70c without any wire, but the disclosure is not limited thereto; in some other embodiments, the first control circuit board and the second control circuit board may be in signal communication with each other via a wire.

Figure 7:
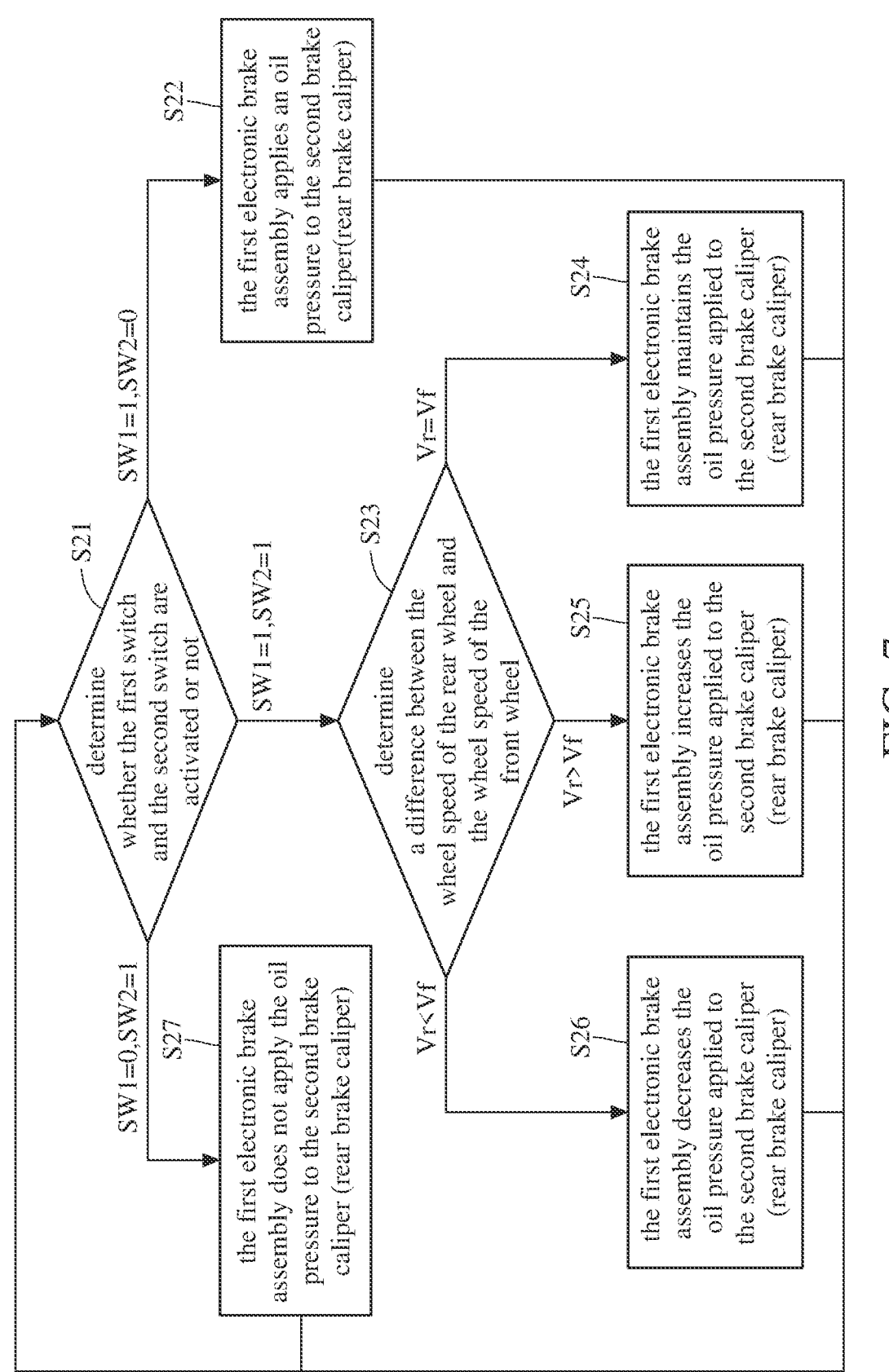
FIG. 7 is a flow chart of a control method for a brake system according to a seventh embodiment of the disclosure.

Then, the following paragraphs will introduce a control method cooperated with the brake system 1c shown in FIG. 6. Refer to FIGS. 6 and 7, where FIG. 7 is a flow chart of a control method for the brake system 1c according to a seventh embodiment of the disclosure.

The control method includes the first electronic brake assembly 50c that controls the oil pressure applied to the second brake caliper 21c according to whether the first switch 30c and the second switch 40c are activated or not. The following paragraphs will further introduce the control method in detail.

Firstly, the step S21 is performed to determine whether the first switch 30c and the second switch 40c are activated or not. In FIG. 7, "SW1=1" represents that the first switch 30c is activated, "SW1=0" represents that the first switch 30c is not activated, "SW2=1" represents that the second switch 40c is activated, and "SW2=0" represents that the second switch 40c is not activated.

In the step S21, when the first switch 30c is activated and the second switch 40c is not activated, the step S22 is performed to enable the first electronic brake assembly 50c to apply an oil pressure to the second brake caliper 21c. Specifically, when the first brake lever 12c is operated and the second brake lever 22c is not operated, the first switch 30c is activated by the first brake lever 12c, and the second switch 40c is not activated by the second brake lever 22c, such that the first control circuit board 60c enables the first electronic brake assembly 50c to apply the oil pressure to the second brake caliper 21c via the second control circuit board 70c. As a result, when the first brake lever 12c is operated, the first brake lever 12c not only drives the first brake caliper 11c to brake the front wheel, but also enables the first electronic brake assembly 50c to drive the second brake caliper 21c to brake the rear wheel, such that the difference between the wheel speed of the front wheel and the wheel speed of the rear wheel can be decreased, thereby increasing the safety during the braking process.

In the step S21, when the first switch 30c and the second switch 40c both are activated, the first electronic brake assembly 50c controls the oil pressure applied to the second brake caliper 21c according to the wheel speed of the front wheel and the wheel speed of the rear wheel. That is, in the case that the first brake lever 12c and the second brake lever 22c both are operated, the first switch 30c and the second switch 40c are respectively activated by the first brake lever 12c and the second brake lever 22c. At this moment, the first electronic brake assembly 50c applies the oil pressure to the second brake caliper 21c as the first switch 30c is activated, the first control circuit board 60c and the second control circuit board 70c respectively receive the wheel speed of the front wheel measured by the first wheel speed sensor 80c and the wheel speed of the rear wheel measured by the second wheel speed sensor 90c, the first control circuit board 60c transmits the wheel speed of the front wheel to the second control circuit board 70c, and the second control circuit board 70c enables the first electronic brake assembly 50c to control the oil pressure applied to the second brake caliper 21c according to the received the wheel speed of the front wheel and the received wheel speed of the rear wheel.

Specifically, in the step S21, when the first switch 30c and the second switch 40c both are activated, the step S23 is performed to determine a difference between the wheel speed of the rear wheel and the wheel speed of the front wheel. In FIG. 7, the wheel speed of the rear wheel is denoted as "Vr", and the wheel speed of the front wheel is denoted as "Vf".

In step S23, when the wheel speed of the rear wheel is equal to the wheel speed of the front wheel, the step S24 is performed to enable the first electronic brake assembly 50c to maintain the oil pressure applied to the second brake caliper 21c. In step S23, when the wheel speed of the rear wheel is greater than the wheel speed of the front wheel, the step S25 is performed to enable the first electronic brake assembly 50c to increase the oil pressure applied to the second brake caliper 21c. In step S23, when the wheel speed of the rear wheel is smaller than the wheel speed of the front wheel, the step S26 is performed to enable the first electronic brake assembly 50c to decrease the oil pressure applied to the second brake caliper 21c.

For example, in the case that the wheel speed of the rear wheel is determined to be equal to the wheel speed of the front wheel in the step S23, it represents that there is no difference between the wheel speed of the rear wheel and the wheel speed of the front wheel, and thus the oil pressure applied to the second brake caliper 21c by the first electronic brake assembly 50c is determined to be proper so as to not adversely affect the safety during the braking process. Therefore, the second control circuit board 70c enables the first electronic brake assembly 50c to maintain the oil pressure applied to the second brake caliper 21c.

In the case that the wheel speed of the rear wheel is determined to be greater than the wheel speed of the front wheel in the step S23, it represents that the oil pressure applied to the second brake caliper 21c is insufficient, which may cause potential safety issues during the braking process. Therefore, the second control circuit board 70c enables the first electronic brake assembly 50c to increase the oil pressure applied to the second brake caliper 21c for reducing the difference between the wheel speed of the rear wheel and the wheel speed of the front wheel, thereby ensuring the safety during the braking process.

In the case that the wheel speed of the rear wheel is determined to be smaller than the wheel speed of the front wheel in the step S23, it represents that the oil pressure applied to the second brake caliper 21c is too high, which may cause potential safety issues during the braking process. Therefore, the second control circuit board 70c enables the first electronic brake assembly 50c to decrease the oil pressure applied to the second brake caliper 21c for reducing the difference between the wheel speed of the rear wheel and the wheel speed of the front wheel, thereby ensuring the safety during the braking process.

In the step S21, when the first switch 30c is not activated and the second switch 40c is activated, the step S27 is performed not to enable the first electronic brake assembly 50c to apply the oil pressure to the second brake caliper 21c. Specifically, when the first brake lever 12c is not operated and the second brake lever 22*c* is operated, the second brake lever 22*c* drives the second brake caliper 21*c* to brake the rear wheel and activate the second switch 40*c*, but the first switch 30*c* is in a non-activated state.

In the step S21, the case that the first switch 30*c* and the second switch 40*c* both are not activated represents that the first brake lever 12*c* and the second brake lever 22*c* both are not operated; that is, the bicycle is not in the braking state, and thus this case will not be further discussed.

In the above embodiment, the first brake caliper 11*c* is the front brake caliper, the first brake lever 12*c* is the left brake lever, the second brake caliper 21*c* is the rear brake caliper, and the second brake lever 22*c* is the right brake lever, but the disclosure is not limited thereto. For example, refer to FIG. 8, where FIG. 8 is a block diagram of a brake system 1*d* according to an eighth embodiment of the disclosure.

The brake system 1*d* of this embodiment is similar to the brake system 1*c* with the reference to FIG. 6, the brake system 1*d* also includes a first hydraulic brake assembly 10*d*, a second hydraulic brake assembly 20*d*, a first switch 30*d*, a second switch 40*d*, a first electronic brake assembly 50*d*, a first control circuit board 60*d*, a second control circuit board 70*d*, a first wheel speed sensor 80*d*, a second wheel speed sensor 90*d*, a first battery 100*d* and a second battery 110*d*, the main difference between the brake systems 1*d* and 1*c* is that the first brake caliper 11*d* is a rear brake caliper, the first brake lever 12*d* is a right brake lever, the second brake caliper 21*d* is a front brake caliper, the second brake lever 22*d* is a left brake lever, the first wheel speed sensor 80*d* measures the wheel speed of the rear wheel, and the second wheel speed sensor 90*d* measures the wheel speed of the front wheel, and thus the detail structures of the aforementioned components of the brake system 1*d* of this embodiment and the connections among them can be referred to that of the brake system 1*c* with reference to FIG. 6 and will not be repeatedly introduced hereinafter.

Figure 8:
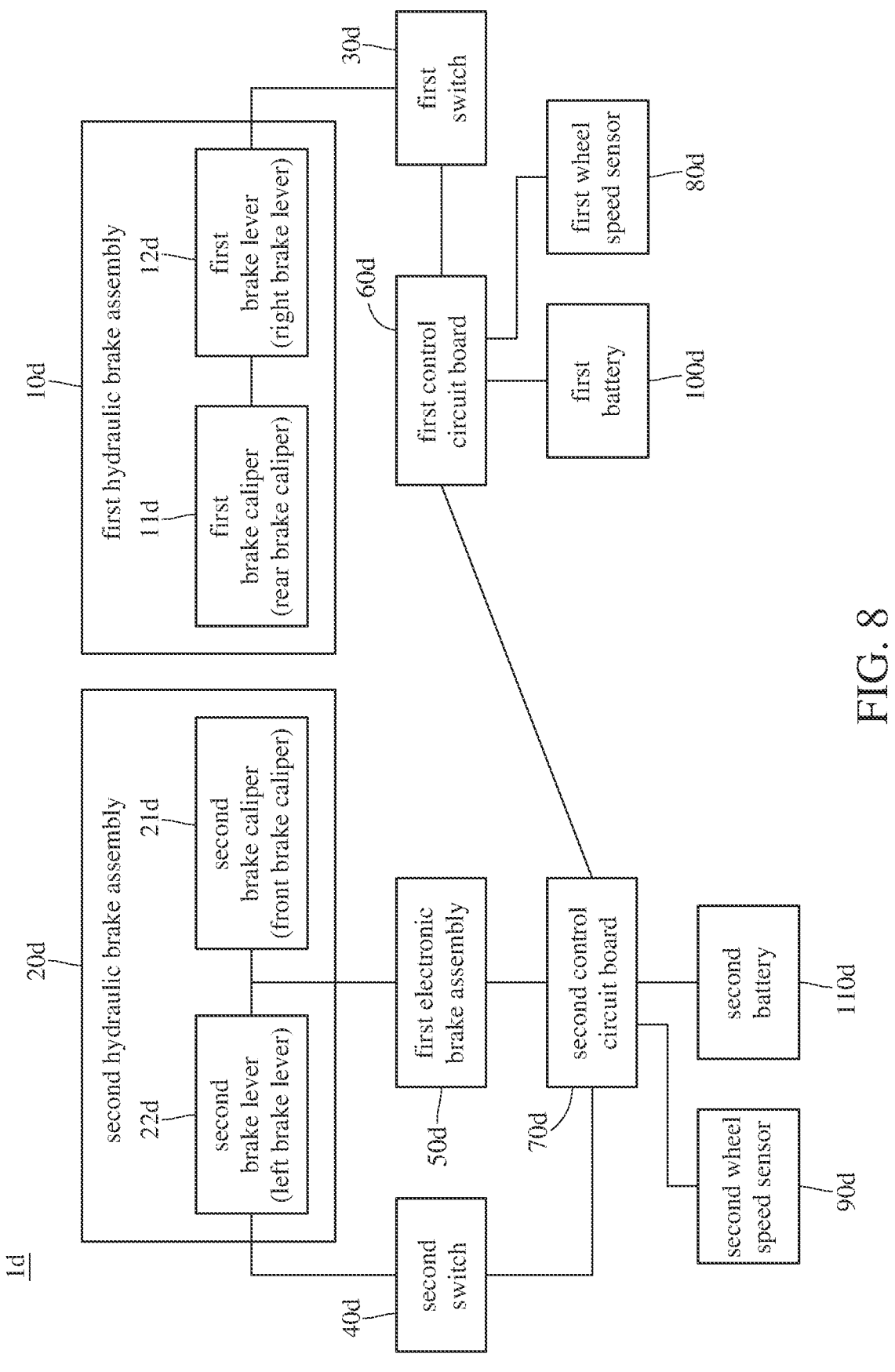
FIG. 8 is a block diagram of a brake system according to an eighth embodiment of the disclosure.
Figure 9:
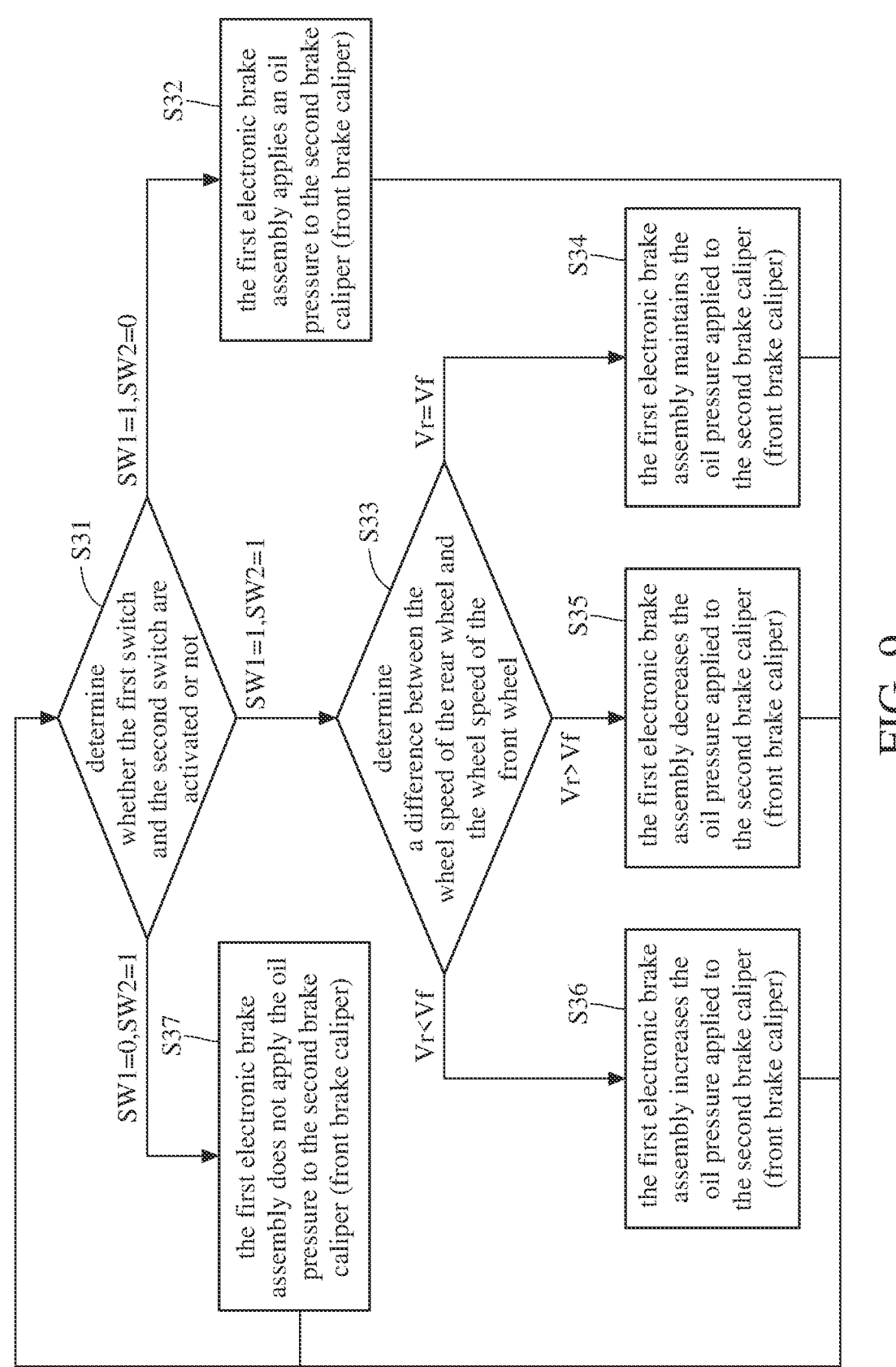
FIG. 9 is a flow chart of a control method for a brake system according to a ninth embodiment of the disclosure.

Then, the following paragraphs will introduce a control method cooperated with the brake system 1*d* shown in FIG. 8. Refer to FIGS. 8 and 9, where FIG. 9 is a flow chart of a control method for the brake system 1*d* according to a ninth embodiment of the disclosure.

The control method includes that the first electronic brake assembly 50*d* controls the oil pressure applied to the second brake caliper 21*d* according to whether the first switch 30*d* and the second switch 40*d* are activated or not. The following paragraphs will further introduce the control method in detail.

Firstly, the step S31 is performed to determine whether the first switch 30*d* and the second switch 40*d* are activated or not. In FIG. 9, "SW1=1" represents that the first switch 30*d* is activated, "SW1=0" represents that the first switch 30*d* is not activated, "SW2=1" represents that the second switch 40*d* is activated, and "SW2=0" represents that the second switch 40*d* is not activated.

In the step S31, when the first switch 30*d* is activated and the second switch 40*d* is not activated, the step S32 is performed to enable the first electronic brake assembly 50*d* to apply an oil pressure to the second brake caliper 21*d*. Specifically, when the first brake lever 12*d* is operated and the second brake lever 22*d* is not operated, the first switch 30*d* is activated by the first brake lever 12*d*, and the second switch 40*d* is not activated by the second brake lever 22*d*, such that the first control circuit board 60*d* enables the first electronic brake assembly 50*d* to apply the oil pressure to the second brake caliper 21*d* via the second control circuit board 70*d*. As a result, when the first brake lever 12*d* is operated, the first brake lever 12*d* not only drives the first brake caliper

11*d* to brake the rear wheel, but also enables the first electronic brake assembly 50*d* to drive the second brake caliper 21*d* to brake the front wheel, such that the difference between the wheel speed of the front wheel and the wheel speed of the rear wheel can be decreased, thereby increasing the safety during the braking process.

In the step S31, when the first switch 30*d* and the second switch 40*d* both are activated, the first electronic brake assembly 50*d* controls the oil pressure applied to the second brake caliper 21*d* according to the wheel speed of the front wheel and the wheel speed of the rear wheel. That is, in the case that the first brake lever 12*d* and the second brake lever 22*d* both are operated, the first switch 30*d* and the second switch 40*d* are respectively activated by the first brake lever 12*d* and the second brake lever 22*d*. At this moment, the first electronic brake assembly 50*d* applies the oil pressure to the second brake caliper 21*d* as the first switch 30*d* is activated, the first control circuit board 60*d* and the second control circuit board 70*d* respectively receive the wheel speed of the rear wheel measured by the first wheel speed sensor 80*d* and the wheel speed of the front wheel measured by the second wheel speed sensor 90*d*, the first control circuit board 60*d* transmits the wheel speed of the rear wheel to the second control circuit board 70*d*, and the second control circuit board 70*d* enables the first electronic brake assembly 50*d* to control the oil pressure applied to the second brake caliper 21*d* according to the received the wheel speed of the front wheel and the received wheel speed of the rear wheel.

Specifically, in the step S31, when the first switch 30*d* and the second switch 40*d* both are activated, the step S33 is performed to determine a difference between the wheel speed of the rear wheel and the wheel speed of the front wheel. In FIG. 9, the wheel speed of the rear wheel is denoted as "Vr", and the wheel speed of the front wheel is denoted as "Vf".

In step S33, when the wheel speed of the rear wheel is equal to the wheel speed of the front wheel, the step S34 is performed to enable the first electronic brake assembly 50*d* to maintain the oil pressure applied to the second brake caliper 21*d*. In step S33, when the wheel speed of the rear wheel is greater than the wheel speed of the front wheel, the step S35 is performed to enable the first electronic brake assembly 50*d* to decrease the oil pressure applied to the second brake caliper 21*d*. In step S35, when the wheel speed of the rear wheel is smaller than the wheel speed of the front wheel, the step S36 is performed to enable the first electronic brake assembly 50*d* to increase the oil pressure applied to the second brake caliper 21*d*.

For example, in the case that the wheel speed of the rear wheel is determined to be equal to the wheel speed of the front wheel in the step S33, it represents that there is no difference between the wheel speed of the rear wheel and the wheel speed of the front wheel, and thus the oil pressure applied to the second brake caliper 21*d* by the first electronic brake assembly 50*d* is determined to be proper so as to not adversely affect the safety during the braking process. Therefore, the second control circuit board 70*d* enables the first electronic brake assembly 50*d* to maintain the oil pressure applied to the second brake caliper 21*d*.

In the case that the wheel speed of the rear wheel is determined to be greater than the wheel speed of the front wheel in the step S33, it represents that the oil pressure applied to the second brake caliper 21*d* is too high, which may cause potential safety issues during the braking process. Therefore, the second control circuit board 70*d* enables the first electronic brake assembly 50*d* to decrease the oil pressure applied to the second brake caliper 21*d* for reducing the difference between the wheel speed of the rear wheel and the wheel speed of the front wheel, thereby ensuring the safety during the braking process.

In the case that the wheel speed of the rear wheel is determined to be smaller than the wheel speed of the front wheel in the step S33, it represents that the oil pressure applied to the second brake caliper 21*d* is insufficient, which may cause potential safety issues during the braking process. Therefore, the second control circuit board 70*d* enables the first electronic brake assembly 50*d* to increase the oil pressure applied to the second brake caliper 21*d* for reducing the difference between the wheel speed of the rear wheel and the wheel speed of the front wheel, thereby ensuring the safety during the braking process.

In the step S31, when the first switch 30*d* is not activated and the second switch 40*d* is activated, the step S37 is performed not to enable the first electronic brake assembly 50*d* to apply the oil pressure to the second brake caliper 21*d*. Specifically, when the first brake lever 12*d* is not operated and the second brake lever 22*d* is operated, the second brake lever 22*d* drives the second brake caliper 21*d* to brake the front wheel and activate the second switch 40*d*, but the first switch 30*d* is in a non-activated state.

In the step S31, the case that the first switch 30*d* and the second switch 40*d* both are not activated represents that the first brake lever 12*d* and the second brake lever 22*d* both are not operated; that is, the bicycle is not in the braking state, and thus this case will not be further discussed.

Figure 10:
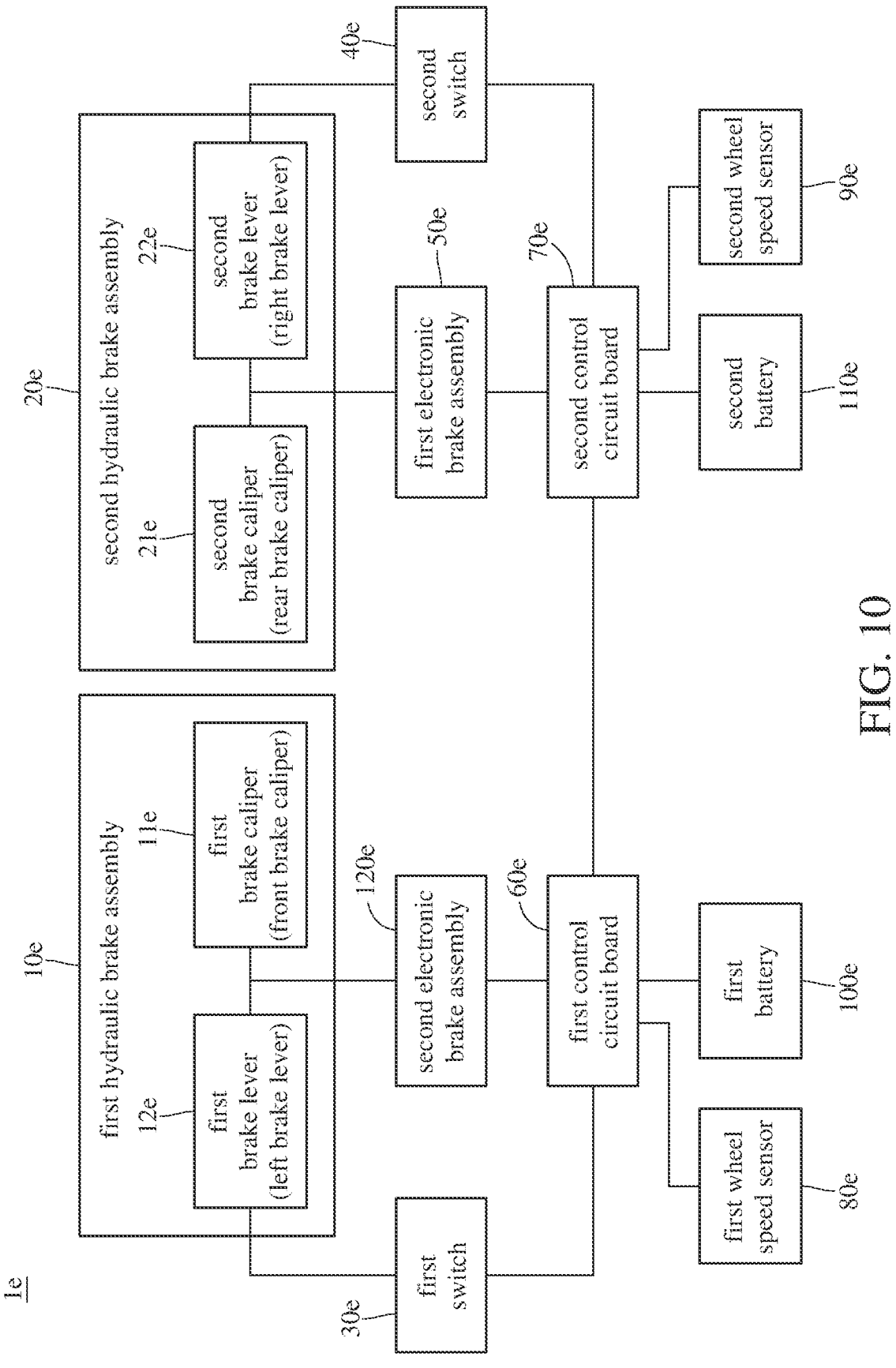
FIG. 10 is a block diagram of a brake system according to a tenth embodiment of the disclosure.

Then, refer to FIG. 10, where FIG. 10 is a block diagram of a brake system 1*e* according to a tenth embodiment of the disclosure.

In this embodiment, the brake system 1*e* not only includes a first hydraulic brake assembly 10*e*, a second hydraulic brake assembly 20*e*, a first switch 30*e*, a second switch 40*e*, a first electronic brake assembly 50*e*, a first control circuit board 60*e*, a second control circuit board 70*e*, a first wheel speed sensor 80*e*, a second wheel speed sensor 90*e*, a first battery 100*e* and a second battery 110*e*, but also further includes a second electronic brake assembly 120*e*.

The brake system 1*e* of this embodiment is similar to the brake system 1*c* with reference to FIG. 6, the main difference between them is that the brake system 1*e* of this embodiment further includes the second electronic brake assembly 120*e*, and thus the following paragraph mainly introduces the detail structure of the second electronic brake assembly 120*e* and the connections between the second electronic brake assembly 120*b* and other components, and the other components of the brake system 1*e* can be referred to the brake system 1*c* with reference to FIG. 6 and will not be repeatedly introduced hereinafter.

In this embodiment, the second electronic brake assembly 120*e* is connected to the first hydraulic brake assembly 10*e*. For example, the second electronic brake assembly 120*e* may be disposed at a proper position of the oil path between the first brake lever 12*e* and the first brake caliper 11*e*. The second electronic brake assembly 120*e*, for example, includes a motor and a piston (not shown). The motor can move the piston so as to produce an oil pressure in the oil path to drive the first brake caliper 11*e*. In another embodiment, the second electronic brake assembly 120*e* is preferably disposed on the hydraulic housing of the first brake lever 12*e*, and the second electronic brake assembly 120*e*, for example, includes a motor and a transmission component (not shown). The motor is connected to the link of the first brake lever 12*e* via the transmission component, such that the motor can move the piston of the first brake lever 12*e* in the hydraulic housing via the transmission component and the link of the first brake lever 12*e* so as to produce an oil pressure for driving the first brake caliper 11*e*. In addition, the second electronic brake assembly 120*e* is electrically connected to the first control circuit board 60*e* so as to be electrically connected to the first switch 30*e* via the first control circuit board 60*e* and to be electrically connected to the second switch 40*c* via the first control circuit board 60*e* and the second control circuit board 70*c*.

Figure 11:
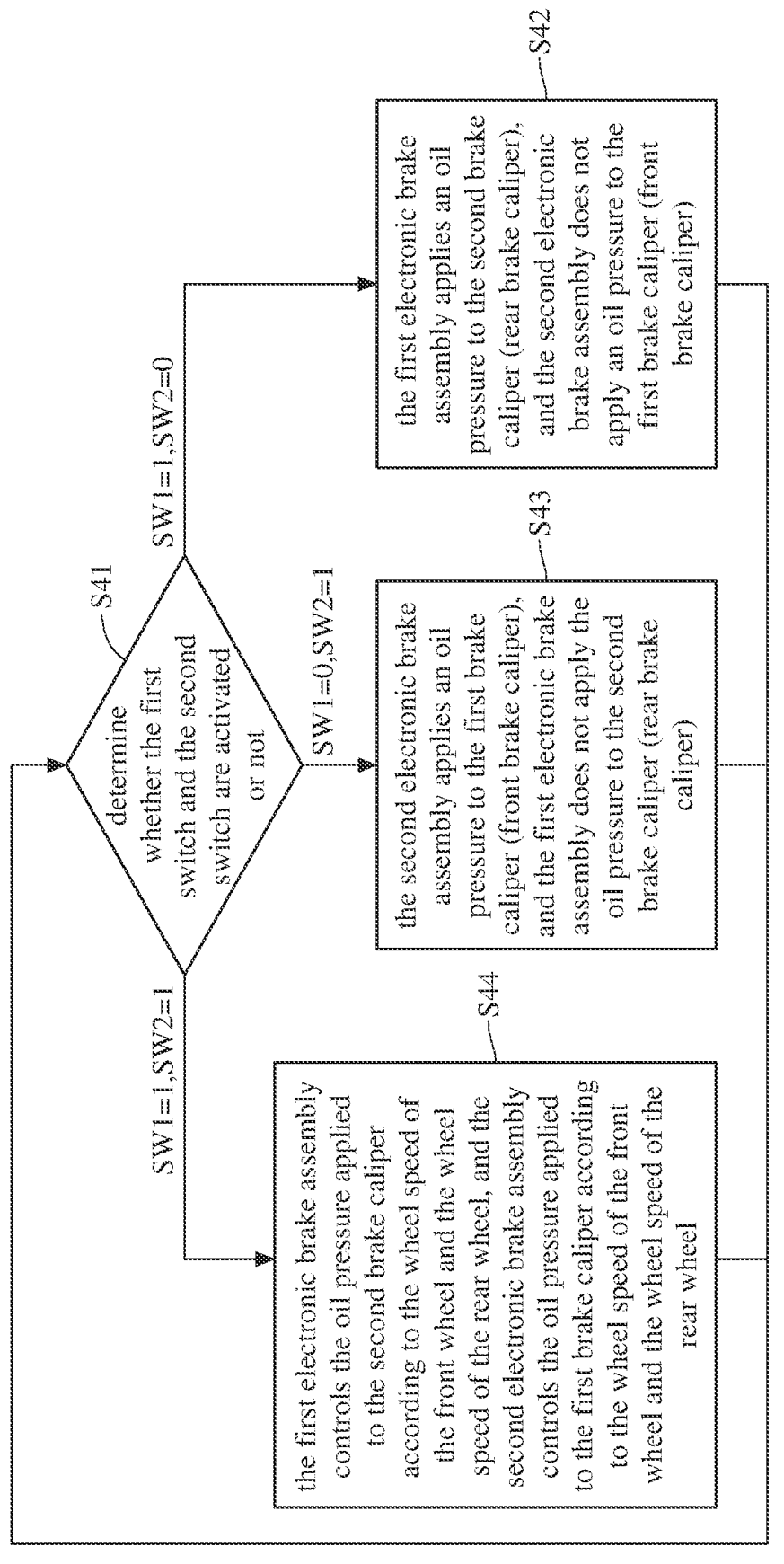
FIG. 11 is a flow chart of a control method for a brake system according to an eleventh embodiment of the disclosure.

Then, the following paragraphs will introduce a control method cooperated with the brake system 1*e* shown in FIG. 10. Refer to FIGS. 10 and 11, where FIG. 11 is a flow chart of a control method for the brake system 1*e* according to an eleventh embodiment of the disclosure.

The control method includes that the first electronic brake assembly 50*e* controls the oil pressure applied to the second brake caliper 21*e* according to whether the first switch 30*e* and the second switch 40*e* are activated or not, and the second electronic brake assembly 120*e* controls the oil pressure applied to the first brake caliper 11*e* according to whether the first switch 30*e* and the second switch 40*e* are activated or not. The following paragraphs will further introduce the control method in detail.

Firstly, the step S41 is performed to determine whether the first switch 30*e* and the second switch 40*e* are activated or not. In FIG. 11, "SW1=1" represents that the first switch 30*e* is activated, "SW1=0" represents that the first switch 30*e* is not activated, "SW2=1" represents that the second switch 40*e* is activated, and "SW2=0" represents that the second switch 40*e* is not activated.

In the step S41, when the first switch 30*e* is activated and the second switch 40*e* is not activated, the step S42 is performed to enable the first electronic brake assembly 50*e* to apply an oil pressure to the second brake caliper 21*e* and not to enable the second electronic brake assembly 120 to apply an oil pressure to the first brake caliper 11*e*. Specifically, when the first brake lever 12*e* is operated and the second brake lever 22*e* is not operated, the first switch 30*e* is activated by the first brake lever 12*e*, and the second switch 40*e* is not activated by the second brake lever 22*e*, such that the first control circuit board 60*e* enables the first electronic brake assembly 50*e* to apply the oil pressure to the second brake caliper 21*e* via the second control circuit board 70*e*, and the second electronic brake assembly 120*e* does not apply the oil pressure to the first brake caliper 11*e*. As a result, when the first brake lever 12*e* is operated, the first brake lever 12*e* not only drives the first brake caliper 11*e* to brake the front wheel, but also enables the first electronic brake assembly 50*e* to drive the second brake caliper 21*e* to brake the rear wheel, such that the difference between the wheel speed of the front wheel and the wheel speed of the rear wheel can be decreased, thereby increasing the safety during the braking process.

In the step S41, when the second switch 40*e* is activated and the first switch 30*e* is not activated, the step S43 is performed to enable the second electronic brake assembly 120*e* to apply the oil pressure to the first brake caliper 11*e* and not to enable the first electronic brake assembly 50*e* to apply the oil pressure to the second brake caliper 21*e*. Specifically, when the second brake lever 22*e* is operated and the first brake lever 12*e* is not operated, the second switch 40*e* is activated by the second brake lever 22*e*, and the first switch 30*e* is not activated by the first brake lever 12*e*, such that the second control circuit board 70*e* enables the second electronic brake assembly 120*e* to apply the oil pressure to the first brake caliper 11*e* via the first control circuit board 60*e*, and the first electronic brake assembly 50*e* does not apply the oil pressure to the second brake caliper 21e. As a result, when the second brake lever 22e is operated, the second brake lever 22e not only drives the second brake caliper 21e to brake the rear wheel, but also enables the second electronic brake assembly 120e to drive the first brake caliper 11e to brake the front wheel, such that the difference between the wheel speed of the front wheel and the wheel speed of the rear wheel can be decreased, thereby increasing the safety during the braking process.

In the step S41, when the first switch 30e and the second switch 40e both are activated, the step S44 is performed to enable the first electronic brake assembly 50e to control the oil pressure applied to the second brake caliper 21e according to the wheel speed of the front wheel and the wheel speed of the rear wheel and to enable the second electronic brake assembly 120e to control the oil pressure applied to the first brake caliper 11e according to the wheel speed of the front wheel and the wheel speed of the rear wheel.

Specifically, when the first switch 30e and the second switch 40e both are activated, the first control circuit board 60e and the second control circuit board 70e respectively receive the wheel speed of the front wheel measured by the first wheel speed sensor 80c and the wheel speed of the rear wheel measured by the second wheel speed sensor 90e and share the received information with each other. In the step S44, when the wheel speed of the rear wheel is equal to the wheel speed of the front wheel, the first electronic brake assembly 50c maintains the oil pressure applied to the second brake caliper 21e, and the second electronic brake assembly 120e maintains the oil pressure applied to the first brake caliper 11e. For example, when the second control circuit board 70e and the first control circuit board 60e determine that the wheel speed of the rear wheel is equal to the wheel speed of the front wheel in the step S44, it represents that there is no difference between the wheel speed of the rear wheel and the wheel speed of the front wheel, and thus the oil pressure applied to the second brake caliper 21e by the first electronic brake assembly 50e and the oil pressure applied to the first brake caliper 11e by the second electronic brake assembly 120e are determined to be proper so as to not adversely affect the safety during the braking process. Therefore, the second control circuit board 70e enables the first electronic brake assembly 50e to maintain the oil pressure applied to the second brake caliper 21e, and the first control circuit board 60e enables the second electronic brake assembly 120e to maintain the oil pressure applied to the first brake caliper 11c.

In the step S44, when the wheel speed of the rear wheel is greater than the wheel speed of the front wheel, it may adversely affect the safety during the braking process, and thus the second control circuit board 70e enables the first electronic brake assembly 50e to increase the oil pressure applied to the second brake caliper 21e, and the first control circuit board 60e enables the second electronic brake assembly 120e to decrease the oil pressure applied to the first brake caliper 11e for reducing the difference between the wheel speed of the rear wheel and the wheel speed of the front wheel, but the disclosure is not limited thereto; in some other embodiments, when the wheel speed of the rear wheel is greater than the wheel speed of the front wheel, only the first electronic brake assembly 50e may increase the oil pressure applied to the second brake caliper 21e, or only the second electronic brake assembly 120e may decrease the oil pressure applied to the first brake caliper 11e for reducing the difference between the wheel speed of the rear wheel and the wheel speed of the front wheel.

In the step S44, when the wheel speed of the rear wheel is smaller than the wheel speed of the front wheel, it may adversely affect the safety during the braking process, and thus the second control circuit board 70e enables the first electronic brake assembly 50e to decrease the oil pressure applied to the second brake caliper 21e, and the first control circuit board 60e enables the second electronic brake assembly 120e to increase the oil pressure applied to the first brake caliper 11e for reducing the difference between the wheel speed of the rear wheel and the wheel speed of the front wheel, but the disclosure is not limited thereto; in some other embodiments, when the wheel speed of the rear wheel is smaller than the wheel speed of the front wheel, only the first electronic brake assembly 50c may decrease the oil pressure applied to the second brake caliper 21e, or only the second electronic brake assembly 120e may increase the oil pressure applied to the first brake caliper 11e for reducing the difference between the wheel speed of the rear wheel and the wheel speed of the front wheel.

Figure 12:
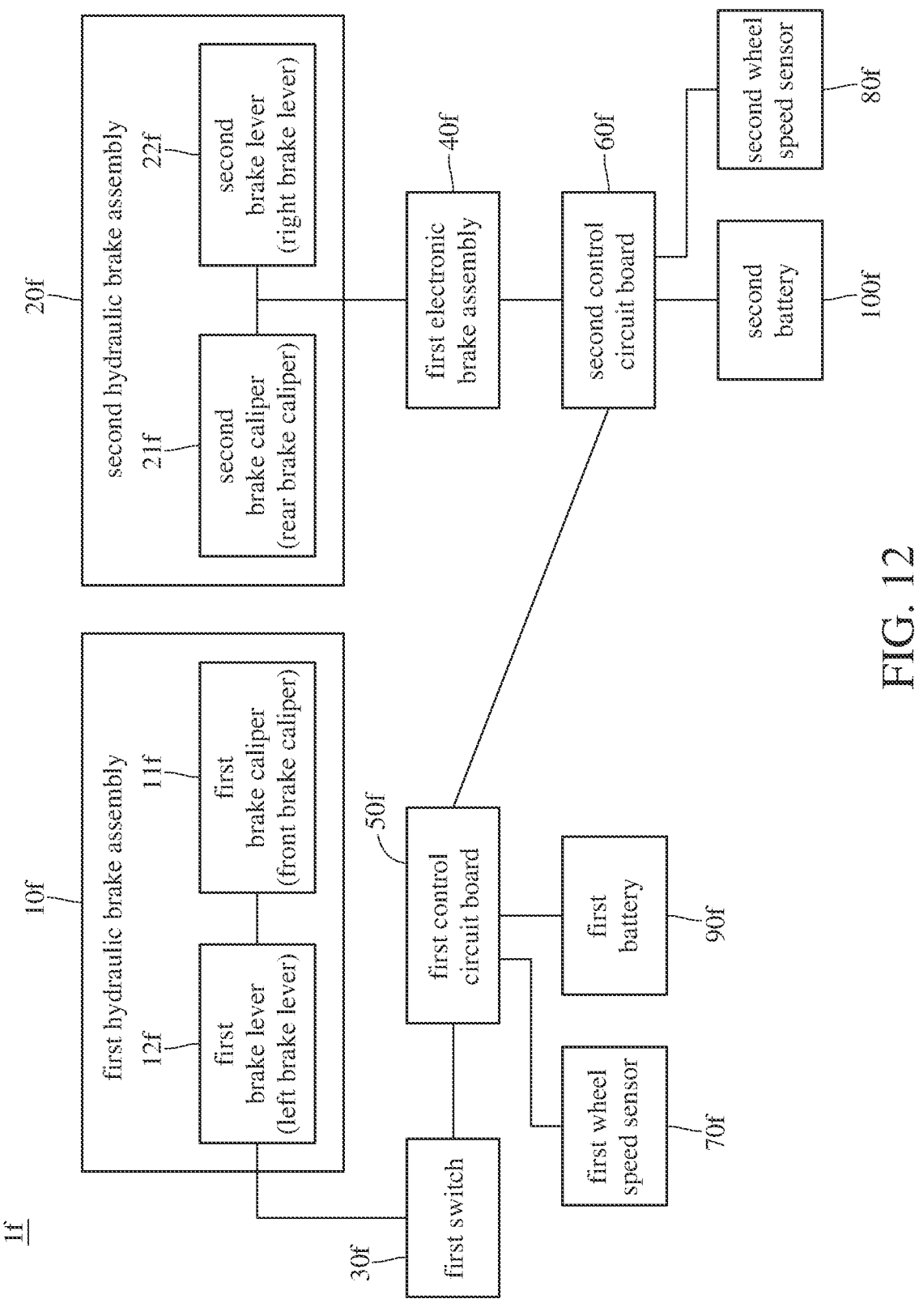
FIG. 12 is a block diagram of a brake system according to a twelfth embodiment of the disclosure.

Then, refer to FIG. 12, where FIG. 12 is a block diagram of a brake system 1f according to a twelfth embodiment of the disclosure.

In this embodiment, the brake system 1f includes a first hydraulic brake assembly 10f, a second hydraulic brake assembly 20f, a first switch 30f and a first electronic brake assembly 40f, a first control circuit board 50f, a second control circuit board 60f, a first wheel speed sensor 70f, a second wheel speed sensor 80f, a first battery 90f and a second battery 100f.

The first hydraulic brake assembly 10f includes a first brake caliper 11f and a first brake lever 12f connected to each other. The first brake caliper 11f is, for example, a front brake caliper of a bicycle and corresponds to a front wheel of the bicycle. The first brake lever 12f is, for example, a left brake lever of the bicycle. The first brake lever 12f is connected to the first brake caliper 11f, for example, via an oil pipe (not shown). The first brake lever 12f, for example, includes a hydraulic housing, a lever, a piston and a link (not shown). The lever is pivotally disposed on the hydraulic housing, the piston is movably located in the hydraulic housing, and the piston is connected to the lever via the link. When the lever is operated, the piston is moved in the hydraulic housing by the link so as to produce an oil pressure, and the oil pressure is transmitted to the first brake caliper 11f via the oil pipe so as to drive the first brake caliper 11f to brake the front wheel.

The second hydraulic brake assembly 20f includes a second brake caliper 21f and a second brake lever 22f connected to each other. The second brake caliper 21f is, for example, a rear brake caliper of a bicycle and corresponds to a rear wheel of the bicycle. The second brake lever 22f is, for example, a right brake lever of the bicycle. The second brake lever 22f is connected to the second brake caliper 21f, for example, via an oil pipe (not shown). The second brake lever 22f, for example, includes a hydraulic housing, a lever, a piston and a link (not shown). The lever is pivotally disposed on the hydraulic housing, the piston is movably located in the hydraulic housing, and the piston is connected to the lever via the link. When the lever is operated, the piston is moved in the hydraulic housing by the link so as to produce an oil pressure, and the oil pressure is transmitted to the second brake caliper 21f via the oil pipe so as to drive the second brake caliper 21f to brake the rear wheel.

The first switch 30f is configured to be activated by the first brake lever 12f when the first brake lever 12f is operated. In one embodiment, the first switch 30f may be disposed on the hydraulic housing of the first brake lever 12f. In such a case, when the lever of the first brake lever 12 is operated, the first switch 30f is directly activated by the lever of the first brake lever 12*f*. In another embodiment, the first switch 30*f* may be disposed at a proper position of an oil path between the first brake lever 12*f* and the first brake caliper 11*f*. In such a case, when the lever of the first brake lever 12*f* is operated, the first switch 30*f* is activated by the lever of the first brake lever 12*f* via the oil pressure.

The first electronic brake assembly 40*f* is connected to the second hydraulic brake assembly 20*f*. For example, the first electronic brake assembly 40*f* may be disposed at a proper position of the oil path between the second brake lever 22*f* and the second brake caliper 21*f*. The first electronic brake assembly 40*f*, for example, includes a motor and a piston (not shown). The motor can move the piston so as to produce an oil pressure in the oil path to drive the second brake caliper 21*f*. In another embodiment, the first electronic brake assembly 40*f* is preferably disposed on the hydraulic housing of the second brake lever 22*f*, and the first electronic brake assembly 40*f*, for example, includes a motor and a transmission component (not shown). The motor is connected to the link of the second brake lever 22*f* via the transmission component, such that the motor can move the piston of the second brake lever 22*f* in the hydraulic housing via the transmission component and the link of the second brake lever 22*f* so as to produce an oil pressure for driving the second brake caliper 21*f*.

The first control circuit board 50*f* is, for example, disposed on the first brake lever 12*f*. The first switch 30*f*, the first wheel speed sensor 70*f* and the first battery 90*f* are electrically connected to the first control circuit board 50*f*. The first wheel speed sensor 70*f* is, for example, configured to measure a wheel speed of the front wheel of the bicycle, and the first battery 90*f* is configured to provide electricity to the first switch 30*f*, the first control circuit board 50*f* and the first wheel speed sensor 70*f*.

The second control circuit board 60*f* is, for example, disposed on the second brake lever 22*f*. The first electronic brake assembly 40*f*, the second wheel speed sensor 80*f* and the second battery 100*f* are electrically connected to the second control circuit board 60*f*. The second wheel speed sensor 80*f* is, for example, configured to measure a wheel speed of the rear wheel of the bicycle, and the second battery 100*f* is configured to provide electricity to the first electronic brake assembly 40*f*, the second control circuit board 60*f* and the second wheel speed sensor 80*f*.

Each of the first control circuit board 50*f* and the second control circuit board 60*f*, for example has a wireless transmission unit (not shown), the first control circuit board 50*f* and the second control circuit board 60*f* are in signal communication with each other via a wireless manner; that is, a signal can be transmitted between the first control circuit board 50*f* and the second control circuit board 60*f* without any wire, but the disclosure is not limited thereto; in some other embodiments, the first control circuit board and the second control circuit board may be in signal communication with each other via a wire.

Figure 13:
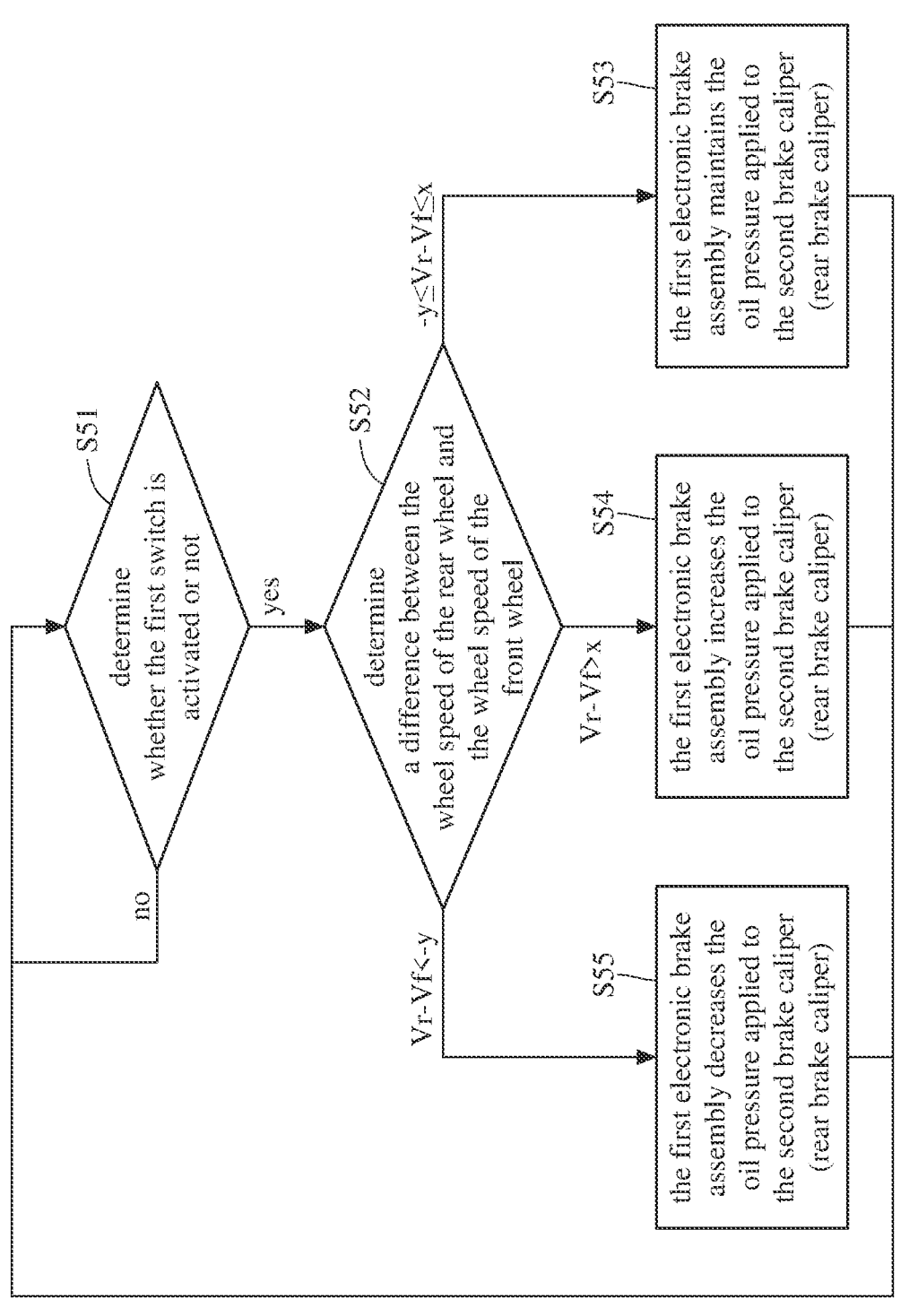
FIG. 13 is a flow chart of a control method for a brake system according to a thirteenth embodiment of the disclosure.

Then, the following paragraphs will introduce a control method cooperated with the brake system 1*f* shown in FIG. 12. Refer to FIGS. 12 and 13, where FIG. 13 is a flow chart of a control method for the brake system 1*f* according to a thirteenth embodiment of the disclosure.

The control method includes that the first electronic brake assembly 40*f* controls the oil pressure applied to the second brake caliper 21*f* according to the wheel speed of the front wheel and the wheel speed of the rear wheel after the first switch 30*f* is activated.

Firstly, the step S51 is performed to determine whether the first switch 30*f* is activated or not. When the first switch 30*f* is activated, the step S52 is performed to determine a difference between the wheel speed of the rear wheel and the wheel speed of the front wheel.

In FIG. 13, the wheel speed of the rear wheel is denoted as "Vr", and the wheel speed of the front wheel is denoted as "Vf".

In the step S52, when the different between the wheel speed of the rear wheel and the wheel speed of the front wheel falls within a range from −y to x (i.e., −y≤Vr−Vf≤x), the step S53 is performed to enable the first electronic brake assembly 40*f* to maintain the oil pressure applied to the second brake caliper 21*f*. In the step S52, when the difference between the wheel speed of the rear wheel and the wheel speed of the front wheel is greater than x (i.e., Vr−Vf>x), the step S54 is performed to enable the first electronic brake assembly 40*f* to increase the oil pressure applied to the second brake caliper 21*f*. In the step S52, when the difference between the wheel speed of the rear wheel and the wheel speed of the front wheel is smaller than −y (i.e., Vr−Vf<−y), the step S55 is performed to enable the first electronic brake assembly 40*f* to decrease the oil pressure applied to the second brake caliper 21*f*. The aforementioned x and y are positive integers, where x may be equal to or not equal to y.

Specifically, when the first brake lever 12*f* is operated, the first switch 30*f* is activated by the first brake lever 12*f*, such that the first control circuit board 50*f* enables the first electronic brake assembly 40*f* to apply the oil pressure to the second brake caliper 21*f* via the second control circuit board 60*f*. Then, the first control circuit board 50*f* and the second control circuit board 60*f* respectively receive the wheel speed of the front wheel measured by the first wheel speed sensor 70*f* and the wheel speed of the rear wheel measured by the second wheel speed sensor 80*f*, the first control circuit board 50*f* transmits the wheel speed of the front wheel to the second control circuit board 60*f*, and the second control circuit board 60*f* enables the first electronic brake assembly 40*f* to control the oil pressure applied to the second brake caliper 21*f* according to the received wheel speed of the front wheel and the received wheel speed of the rear wheel.

In the step S52, when the difference between the wheel speed of the rear wheel and the wheel speed of the front wheel is determined to fall within the range from −y to x (i.e., −y≤Vr−Vf≤x), it represents that the difference between the wheel speed of the rear wheel and the wheel speed of the front wheel is in an acceptable range, and thus the oil pressure applied to the second brake caliper 21*f* by the first electronic brake assembly 40*f* is determined to be proper so as to not adversely affect the safety during the braking process. Therefore, the second control circuit board 60*f* enables the first electronic brake assembly 40*f* to maintain the oil pressure applied to the second brake caliper 21*f*.

In the step S52, when the difference between the wheel speed of the rear wheel and the wheel speed of the front wheel is determined to be larger than x (i.e., Vr−Vf>x), it represents that the oil pressure applied to the second brake caliper 21*f* is insufficient, which may cause potential safety issues during the braking process. Therefore, the second control circuit board 60*f* enables the first electronic brake assembly 40*f* to increase the oil pressure applied to the second brake caliper 21*f* for reducing the difference between the wheel speed of the rear wheel and the wheel speed of the front wheel, thereby ensuring the safety during the braking process.

In the step S52, when the difference between the wheel speed of the rear wheel and the wheel speed of the front wheel is determined to be smaller than −y (i.e., Vr−Vf<−y), it represents that the oil pressure applied to the second brake caliper 21*f* is too high, which may cause potential safety issues during the braking process. Therefore, the second control circuit board 60*f* enables the first electronic brake assembly 40*f* to decrease the oil pressure applied to the second brake caliper 21*f* for reducing the difference between the wheel speed of the rear wheel and the wheel speed of the front wheel, thereby ensuring the safety during the braking process.

After the step S53, S54 or S55 is performed, the next step is returned to the step S51.

In the step S51, when the first switch 30*f* is not activated, the next step is returned to the step S51 for determining whether the first switch 30*f* is activated or not.

In this embodiment, the first brake caliper 11*f* is the front brake caliper, the first brake lever 12*f* is the left brake lever, the second brake caliper 21*f* is the rear brake caliper, the second brake lever 22*f* is the right brake lever, the first wheel speed sensor 70*f* measures the wheel speed of the front wheel, and the second wheel speed sensor 80*f* measures the wheel speed of the rear wheel, but the disclosure is not limited thereto; in some other embodiments, the first brake caliper may be the rear brake caliper, the first brake lever may be the right brake lever, the second brake caliper may be the front brake caliper, the second brake lever may be the left brake lever, the first wheel speed sensor measures the wheel speed of the rear wheel, and the second wheel speed sensor measures the wheel speed of the front wheel. In such a case, when the first switch is activated, and the difference between the wheel speed of the rear wheel and the wheel speed of the front wheel is larger than a predetermined value, the first electronic brake assembly decreases the oil pressure applied to the second brake caliper. When the first switch is activated, and the difference between the wheel speed of the rear wheel and the wheel speed of the front wheel is smaller than a predetermined value, the first electronic brake assembly increases the oil pressure applied to the second brake caliper.

According to the brake systems and the control methods therefor as disclosed in the above embodiments, the first switch that is used to be activated by the first brake lever is electrically connected to the first electronic brake assembly, and the first electronic brake assembly is connected to the second hydraulic brake assembly, such that when the first brake lever is operated, the first brake lever not only drives the first brake caliper, but also enables the first electronic brake assembly to control the oil pressure applied to the second brake caliper. As a result, in the case that the two brake calipers correspond to the front wheel and the rear wheel of the bicycle, the difference between the wheel speeds of the front wheel and the rear wheel can be reduced while the first brake lever is operated, thereby increasing the safety during the braking process.

In some embodiments, when the two switches are respectively activated by the two brake levers, the oil pressure applied to the brake caliper by the electronic brake assembly can be adjusted according to the wheel speed of the front wheel and the wheel speed of the rear wheel for reducing the difference between the wheel speed of the rear wheel and the wheel speed of the front wheel, thereby ensuring the safety during the braking process.

In some embodiments, when the two switches are respectively activated by the two brake levers, the electronic brake assembly can be disabled for preventing the electronic brake assembly and the brake lever from applying the oil pressure to the same brake caliper at the same time, and thus the brake caliper will not brake the rear wheel too hard, thereby ensuring the safety during the braking process.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A brake system, comprising:
a first hydraulic brake assembly, comprising a first brake caliper and a first brake lever connected to each other, wherein the first brake lever is configured to be operated to drive the first brake caliper;
a second hydraulic brake assembly, comprising a second brake caliper and a second brake lever connected to each other, wherein the second brake lever is configured to be operated to drive the second brake caliper;
a first switch, configured to be activated by the first brake lever when the first brake lever is operated;
a second switch, configured to be activated by the second brake lever when the second brake lever is operated; and
a first electronic brake assembly, connected to the second hydraulic brake assembly, wherein the first electronic brake assembly controls an oil pressure applied to the second brake caliper according to whether the first switch and the second switch are activated or not.

2. The brake system according to claim 1, wherein when the first switch is activated and the second switch is not activated, the first electronic brake assembly applies the oil pressure to the second brake caliper; when the second switch is activated, the first electronic brake assembly does not apply the oil pressure to the second brake caliper.

3. The brake system according to claim 2, further comprising a second electronic brake assembly, wherein the second electronic brake assembly is electrically connected to the first switch and the second switch, and is connected to the first hydraulic brake assembly; when the second switch is activated and the first switch is not activated, the second electronic brake assembly applies an oil pressure to the first brake caliper; when the first switch is activated, the second electronic brake assembly does not apply the oil pressure to the first brake caliper.

4. The brake system according to claim 1, further comprising two wheel speed sensors, wherein the two wheel speed sensors are electrically connected to the first electronic brake assembly and configured to measure a wheel speed of a front wheel and a wheel speed of a rear wheel; when the first switch is activated and the second switch is not activated, the first electronic brake assembly applies the oil pressure to the second brake caliper; when the first switch and the second switch both are activated, the first electronic brake assembly controls the oil pressure applied to the second brake caliper according to the wheel speed of the front wheel and the wheel speed of the rear wheel.

5. The brake system according to claim 4, wherein when the first switch and the second switch both are activated, and the wheel speed of the rear wheel is equal to the wheel speed of the front wheel, the first electronic brake assembly maintains the oil pressure applied to the second brake caliper.

6. The brake system according to claim 5, wherein the first brake caliper and the second brake caliper are respectively a front brake caliper and a rear brake caliper; when the first switch and the second switch both are activated, and the wheel speed of the rear wheel is greater than the wheel speed of the front wheel, the first electronic brake assembly increases the oil pressure applied to the second brake caliper; when the first switch and the second switch both are activated, and the wheel speed of the rear wheel is smaller than the wheel speed of the front wheel, the first electronic brake assembly decreases the oil pressure applied to the second brake caliper.

7. The brake system according to claim 5, wherein the first brake caliper and the second brake caliper are respectively a rear brake caliper and a front brake caliper; when the first switch and the second switch both are activated, and the wheel speed of the rear wheel is greater than the wheel speed of the front wheel, the first electronic brake assembly decreases the oil pressure applied to the second brake caliper; when the first switch and the second switch both are activated, and the wheel speed of the rear wheel is smaller than the wheel speed of the front wheel, the first electronic brake assembly increases the oil pressure applied to the second brake caliper.

8. The brake system according to claim 4, further comprising a second electronic brake assembly, wherein the second electronic brake assembly is electrically connected to the first switch and the second switch, and is connected to the first hydraulic brake assembly; when the first switch is not activated and the second switch is activated, the second electronic brake assembly applies an oil pressure to the first brake caliper; when the first switch and the second switch both are activated, the second electronic brake assembly controls the oil pressure applied to the first brake caliper according to the wheel speed of the front wheel and the wheel speed of the rear wheel.

9. A control method for a brake system, the brake system comprising a first brake caliper, a first brake lever configured to be operated to drive the first brake caliper, a first switch activated by the first brake lever when the first brake lever is operated, a second brake caliper, a second brake lever configured to be operated to drive the second brake caliper and a second switch activated by the second brake lever when the second brake lever is operated, the control method comprising:

a first electronic brake assembly which is connected to the second brake caliper controls an oil pressure applied to the second brake caliper according to whether the first switch and the second switch are activated or not.

10. The control method according to claim 9, wherein the step of the first electronic brake assembly controlling the oil pressure applied to the second brake caliper according to whether the first switch and the second switch are activated or not comprises:

determining whether the first switch and the second switch are activated or not;

wherein when the first switch is activated and the second switch is not activated, the first electronic brake assembly applies the oil pressure to the second brake caliper; and wherein when the first switch is not activated and the second switch is activated, or when the first switch and the second switch both are activated, the first electronic brake assembly does not apply the oil pressure to the second brake caliper.

11. The control method according to claim 10, wherein when the first switch is not activated and the second switch is activated, a second electronic brake assembly connected to the first brake caliper applies an oil pressure to the first brake caliper; when the first switch is activated and the second switch is not activated, or when the first switch and the second switch both are activated, the second electronic brake assembly does not apply the oil pressure to the first brake caliper.

12. The control method according to claim 9, wherein the step of the first electronic brake assembly controlling the oil pressure applied to the second brake caliper according to whether the first switch and the second switch are activated or not comprises:

determining whether the first switch and the second switch are activated or not;

wherein when the first switch is activated and the second switch is not activated, the first electronic brake assembly applies the oil pressure to the second brake caliper; and wherein when the first switch and the second switch both are activated, the first electronic brake assembly controls the oil pressure applied to the second brake caliper according to a wheel speed of a front wheel and a wheel speed of a rear wheel.

13. The control method according to claim 12, wherein the first brake caliper and the second brake caliper are respectively a front brake caliper and a rear brake caliper, and the step of the first electronic brake assembly controlling the oil pressure applied to the second brake caliper according to the wheel speed of the front wheel and the wheel speed of the rear wheel comprises:

determining a difference between the wheel speed of the rear wheel and the wheel speed of the front wheel;

wherein when the wheel speed of the rear wheel is equal to the wheel speed of the front wheel, the first electronic brake assembly maintains the oil pressure applied to the second brake caliper;

wherein when the wheel speed of the rear wheel is greater than the wheel speed of the front wheel, the first electronic brake assembly increases the oil pressure applied to the second brake caliper; and wherein when the wheel speed of the rear wheel is smaller than the wheel speed of the front wheel, the first electronic brake assembly decreases the oil pressure applied to the second brake caliper.

14. The control method according to claim 12, wherein the first brake caliper and the second brake caliper are respectively a rear brake caliper and a front brake caliper, and the step of the first electronic brake assembly controlling the oil pressure applied to the second brake caliper according to the wheel speed of the front wheel and the wheel speed of the rear wheel comprises:

determining a difference between the wheel speed of the rear wheel and the wheel speed of the front wheel;

wherein when the wheel speed of the rear wheel is equal to the wheel speed of the front wheel, the first electronic brake assembly maintains the oil pressure applied to the second brake caliper;

wherein when the wheel speed of the rear wheel is greater than the wheel speed of the front wheel, the first electronic brake assembly decreases the oil pressure applied to the second brake caliper; and wherein when the wheel speed of the rear wheel is smaller than the wheel speed of the front wheel, the first electronic brake assembly increases the oil pressure applied to the second brake caliper.

15. The control method according to claim 12, wherein when the first switch is not activated and the second switch is activated, a second electronic brake assembly connected to the first brake caliper applies an oil pressure to the first brake caliper; when the first switch and the second switch both are activated, the second electronic brake assembly controls the oil pressure applied to the first brake caliper according to the wheel speed of the front wheel and the wheel speed of the rear wheel.

16. A control method for a brake system, the brake system comprising a first brake caliper, a first brake lever configured to be operated to drive the first brake caliper, a first switch activated by the first brake lever when the first brake lever is operated, a second brake caliper and a second brake lever configured to be operated to drive the second brake caliper, the control method comprising:

a first electronic brake assembly which is connected to the second brake caliper controls an oil pressure applied to the second brake caliper according to a wheel speed of a front wheel and a wheel speed of a rear wheel after the first switch is activated.

\* \* \* \* \*